United States Patent [19]
LaPorta et al.

[11] Patent Number: 6,014,429
[45] Date of Patent: *Jan. 11, 2000

[54] TWO-WAY WIRELESS MESSAGING SYSTEM WITH TRANSACTION SERVER

[75] Inventors: Thomas F. LaPorta, Thornwood, N.Y.; Krishan Kumar Sabnani, Westfield; Thomas Yat Chung Woo, Red Bank, both of N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/695,497

[22] Filed: Aug. 12, 1996

[51] Int. Cl.[7] .............................. H04M 1/64; H04M 1/60; H04Q 7/00; H04B 1/00
[52] U.S. Cl. ................. 379/88.15; 379/67.1; 379/88.01; 379/170; 379/217; 455/32.1; 455/33.3; 455/38.1; 455/54.1
[58] Field of Search ................... 379/67, 88, 89, 379/67.1, 76, 80, 88.01, 88.04, 88.12, 88.14, 88.16, 88.17, 88.18, 88.22, 88.15, 170, 217; 455/32.1, 33.3, 54.1, 38.1, 38.4

[56] References Cited

U.S. PATENT DOCUMENTS

| | | | |
|---|---|---|---|
| 4,625,081 | 11/1986 | Lotito et al. | 379/88.26 |
| 4,757,525 | 7/1988 | Matthews et al. | 379/88 |
| 5,297,143 | 3/1994 | Fridrich et al. | 370/85.3 |
| 5,327,486 | 7/1994 | Wolff et al. | 379/96 |
| 5,596,318 | 1/1997 | Mitchell | 340/825.44 |
| 5,608,786 | 3/1997 | Gordon | 379/100 |
| 5,631,635 | 5/1997 | Robertson et al. | 340/825.47 |
| 5,737,404 | 4/1998 | Segal | 379/230 |
| 5,742,905 | 4/1998 | Pepe et al. | 455/461 |

Primary Examiner—Fan S. Tsang
Assistant Examiner—Allan Hoosain

[57] ABSTRACT

A two-way wireless messaging system has a messaging network, and a two-way messaging device that originates, receives and replies to messages having dynamic message components to and from the messaging network. A transaction server is located within the messaging network for opening and tracking messages among various users of the two-way messaging system, and closing a transaction to prevent further message delivery and replies after a predetermined transaction is completed. A transaction can remain open until a reply has been received by every intended message recipient; until a desired number of message recipient received a message; or until a specified amount of time has expired.

29 Claims, 11 Drawing Sheets

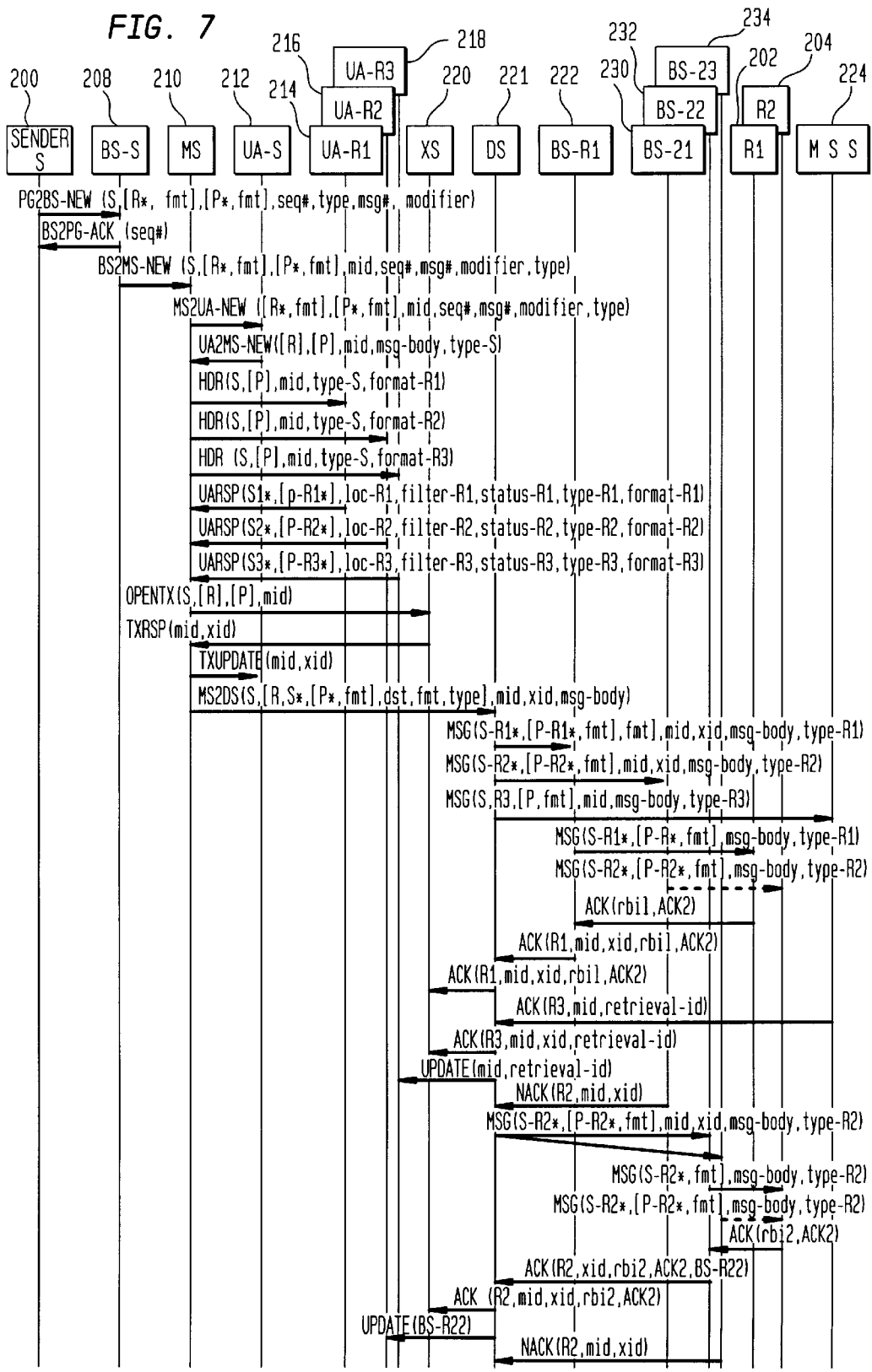

TWO-WAY WIRELESS MESSAGING SYSTEM WITH TRANSACTION SERVER

This application is related to commonly assigned, copending patent applications entitled Two-Way Wireless Messaging System and Two-Way Wireless Messaging System Having User Agent, both filed on Jul. 24, 1996, and incorporated herein by reference in their entirety.

FIELD OF THE INVENTION

This invention relates to a two-way wireless messaging system having a transaction server for opening and tracking messages.

BACKGROUND OF THE INVENTION

Wireless messaging, such as wireless paging, is a popular consumer wireless service and will grow because of the availability of new narrowband Personal Communication Services (PCS) frequencies. Wireless communication and messaging provides the foundation for many different types of services. One popular service is one-way paging, which is now very successful. Its popularity has been contributed by numerous factors, including:

(1) the small form factor of the pager device, making it portable;
(2) the low cost of the paging service;
(3) easy maintenance of the pager device; and
(4) ease of use for both message senders and receivers.

One-way paging, however, has no reply capability A subscriber to a one-way paging service must rely on an alternate method to respond to any messages that are received. For example, after receiving a page from the one-way paging service, a subscriber often has to find a telephone and make a call to respond to the message.

Recently, some ideas have been proposed to design a "two-way paging system" while preserving the benefits of one-way paging, i.e., the small paging device, low cost service, easy maintenance and ease of use. These two-way paging systems include return channels, but they are used only for fixed and limited replies.

In commonly assigned, copending patent applications entitled Two-Way Wireless Messaging System and Two-Way Wireless Messaging System Having User Agent, both filed on Jul. 24, 1996, and incorporated herein by reference in their entirety, the disadvantages of the prior art wireless messaging systems are overcome through the use of a messaging network and two-way wireless messaging device which originates, receives and replies to messages having dynamic message components to and from the messaging network. It would be advantageous if transactions were open and closed at a point in time when a user decides if any further message delivery is necessary or desired.

SUMMARY OF THE INVENTION

In accordance with the present invention, a two-way wireless messaging system has a transaction server located within the messaging system for (a) opening and tracking messages among various users of the two-way messaging system and (b) closing a transaction to prevent further message delivery and replies after a predetermined transaction service is completed.

In one aspect of the present invention, a transaction remains open until a reply has been received by every intended message recipient. In another aspect of the present invention, a transaction remains open until a desired number of message recipients receive a message. In still another aspect of the present invention, a transaction remains open until a specified amount of time has expired.

In yet another aspect of the present invention, the transaction server includes a conversation manager for maintaining the transaction server in open and closed states. In the open state, replies to original messages are accepted and in the closed state replies are unaccepted. A transaction manager is in communication with the conversation manager and tracks the state of a message recipient involved with the transaction, and also communicates with the conversation manager for closing a transaction after the transaction manager has determined that a transaction should be closed.

The foregoing disclosure also discusses a two-way wireless messaging system that can be used also in a public switch telephone network or similar network.

Limitations of existing wireless paging systems are resolved and technical advances are achieved in the present invention by a method and system for transmitting messages on a wireless messaging network with a plurality of user agents and other intelligent servers such as transaction servers, distribution servers and batch servers. The benefits of the present invention are set forth below.

In accordance with one aspect of the present invention, a wireless messaging device can originate new messages or reply to previously received messages along a first communication channel (uplink), and receive messages along a second communication channel (downlink). Each such message is coded in a predetermined manner and includes, among other things, a message number that uniquely identifies a message stored both locally at the device and at the user agent, a modifier representing the customization to be applied to the message, and personalized address aliases.

A user agent inside the two-way messaging network, corresponding to a subscriber of a two-way message system, stores among other things, a plurality of messages and destination addresses. When a user agent receives a coded message from its associated subscriber, it expands the message back to the desired full message and destinations by selecting from the stored messages and destination addresses according to the code.

The message that can be transmitted is highly flexible. In addition to fixed pre-canned components, it can include dynamic components such as embedded replies, choices, predefined variables, etc. As an example, consider a stock trading application. A subscriber is notified via two-way messaging when a stock he or she is interested in has reached a particular value. The notification message can embed a reply with choices to buy or sell and predefined variables for entering the number of shares and share price.

The dynamic components allow customization of messages by message senders and recipients, thus greatly increasing the practical applicability of the system. The particular values of the dynamic components are encoded in the message modifier, and are recovered and applied by the user agent.

The coded message is much shorter than the corresponding full-text message, thus allowing reduced bandwidth usage in a wireless communication environment. Together with user agents, the use of coded message is especially suited for communication scenarios in which the bandwidth in the uplink and downlink directions are asymmetrical, or the end device is limited by processing power, memory storage, or battery capacity.

The two-way messaging system of the present invention also can support multicasting. A message can be forwarded to a plurality of destinations for multiple responses. The address alias contained in a coded message can correspond to a single address, a group address or any combination of the two. With multicast, the number of (uplink and downlink) messages required for the transmission of a message is minimized.

In another aspect of the present invention, the system can track and answer queries about transactions. A transaction is a single or a series of request-response interactions between a message sender and recipient(s). A transaction is most useful for communication scenarios in which selective responses are desired. For example, a transaction can specify that a response arriving beyond a certain time limit will not be needed and should be discarded by the system. When combined with multicast, a transaction can specify the desired semantics of the reply. For example, a transaction with ALL semantics specifies that responses from all recipients are desired, while a transaction with OR semantics specifies that a response from any of the recipients will close the transaction. Once a transaction is closed, additional responses will be discarded by the system.

In accordance with another aspect of the present invention, the system functionalities are distributed among a collection of user agents and intelligent servers. The distributed nature enhances the modularity of the system and makes possible the incremental deployment of the system. For example, a provider desiring only the functionalities of user agents but not those of the transaction servers need to only deploy the user agents.

The method and system of the present invention can be implemented on top of any two-way messaging transport. This includes dedicated paging networks (e.g., narrowband PCS), cellular short messaging service (e.g., IS-95, IS-136 and GSM), or wireless data transport (e.g., ARDIS).

The servers can be implemented on specialized network servers or intermediate switches.

The messaging device can be a dedicated paging device similar to existing alphanumeric pagers, a unit that attaches to a computing device (e.g., PDAs, laptops), or integrated as part of a communication device (e.g., cellular/PCS phones) or a computing device (e.g., PDAs, laptops).

BRIEF DESCRIPTION OF THE DRAWINGS

The foregoing features and advantages of the present invention can be appreciated more fully from the following description, with references to the accompanying drawings in which:

FIG. 7 is a detailed flow chart showing an example of the protocol flow for new message delivery used with the two-way wireless messaging system of the present invention.

DETAILED DESCRIPTION OF THE INVENTION

Figure 1:
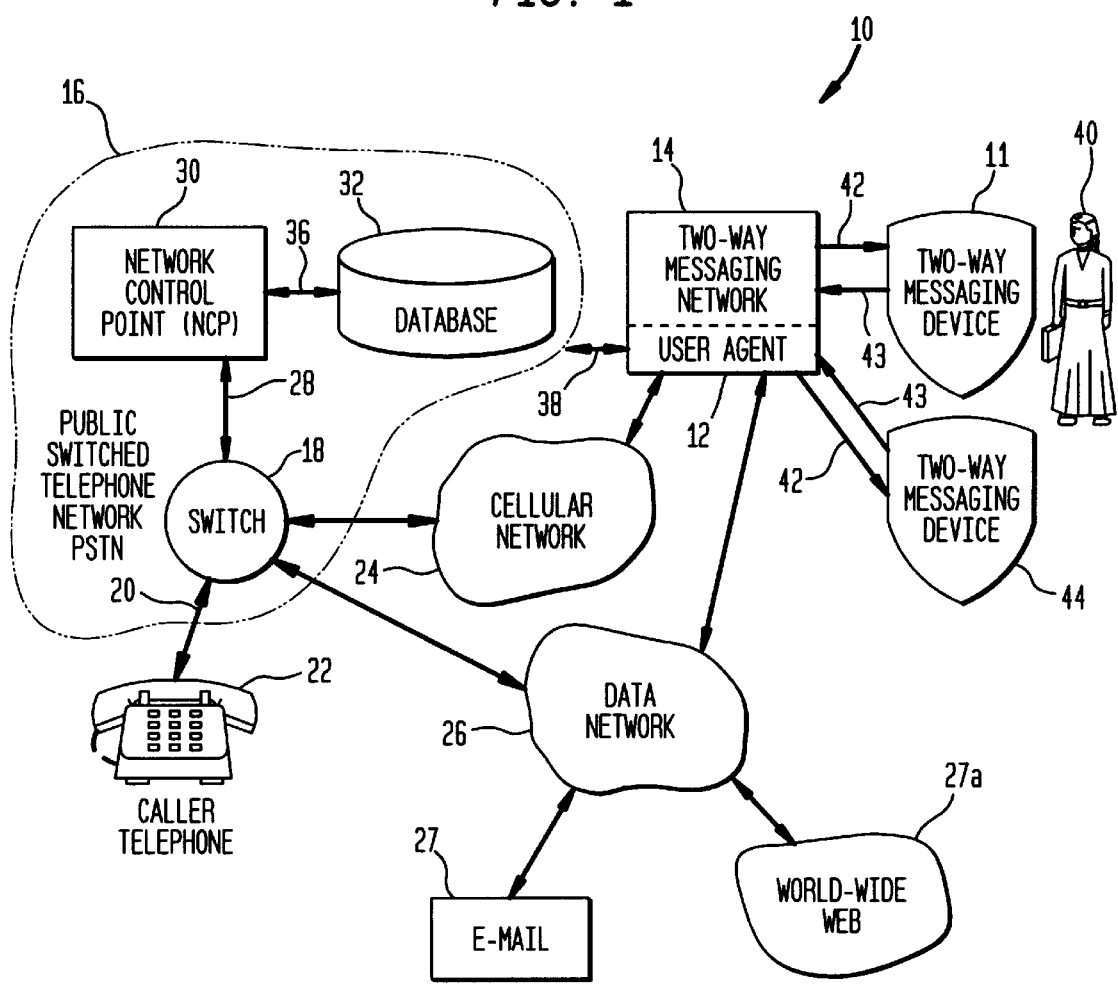
FIG. 1 is a block schematic diagram of a system and method of the two-way wireless messaging system of the present invention showing its use in association with a public switched telephone network, data network, cellular network and a two-way messaging device.

Referring to FIG. 1, there is shown at 10 a two-way wireless messaging system of the present invention, which allows an originating message code from a two-way messaging device 11 to be received in a user agent 12 of a two-way messaging network 14. The two-way messaging device 11 is illustrated throughout many of the drawings as a dedicated two-way pager. The two-way messaging device can also be an attachment to a communication device, or even integrated as part of a communication or computing device. A message can be delivered through a public switched telephone network 16 that includes a network access switch 18 connected to a telephone 22 by a first communication coupling 20 through a twisted pair line, co-axial cable, fiber optic line, wireless link or any other type of communication coupling. The messaging network 14 can also be connected to a cellular network 24 or data network 26 for transporting E-mail messages 27 to a desired destination such as a personal computer at a desired time. Additionally, messages could be forwarded to a destination through the world-wide web 27a.

In accordance with the present invention, a second communication coupling 28 connects the network access switch 18 to a Network Control Point (NCP) 30 that is coupled to a database 32 via a third communication coupling 36. The network 16 is coupled to the messaging network 14 via a fourth communication coupling 38. The communication coupling between the two-way messaging device 11 and two-way messaging network 14 is an air interface. The messaging network 14 also may have at least one user agent 12 corresponding to a subscriber 40 (FIG. 2) of the two-way wireless messaging service. The subscriber 40 receives a message from the messaging network 14 along a first communication channel 42. These messages can include transmitted messages or replies. Messages forwarded by the two-way messaging device 11 to the messaging network 14 are forwarded along a communication return channel 43. In the case in which messages and addresses of recipients are coded, messages received by the two-way messaging network 14 are forwarded to a user agent 12.

In accordance with the present invention, the user agent 12 includes a plurality of stored messages. A predetermined message is forwarded to a desired destination such as a data network 26, public switched telephone network 16 or a cellular network 24 in response to an originating message code that is received from a two-way messaging device 11 of the subscriber 40 along the second communication return channel 43. This originating message code is expanded by the user agent 12 so that the downlink message to the desired destination can include full information. Also, the selected destination could be a second two-way messaging device 44 (FIG. 1).

Figure 2:
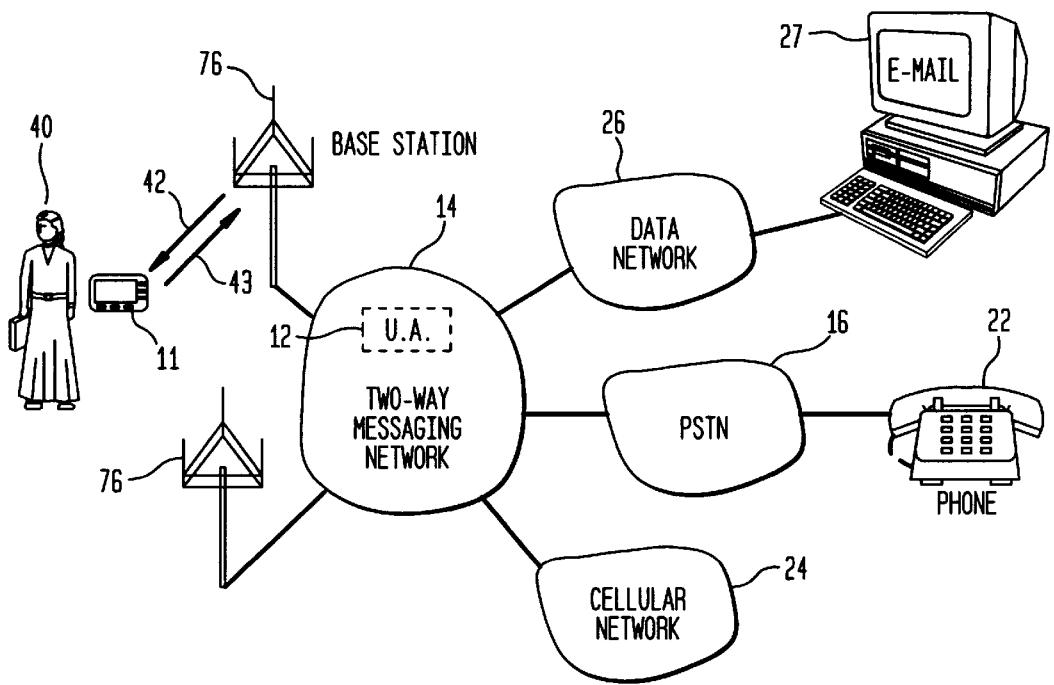
FIG. 2 is another schematic diagram of the two-way wireless messaging system of the present invention.

As shown in FIGS. 1 and 2, the services which can use the two-way wireless messaging system 10 vary, and can include services for sending messages to 1) a telephone 22, 2) a computer as E-Mail 27, and another second messaging device, such as a pager 44. The second communication return channel 43 used by the two-way messaging device 11 and any other device not only carries new messages or replies, but also enhances the system 10 capabilities. It can be used for acknowledgements, thus allowing reliable messaging, and for signaling such as registration or location information, if available. Because the message expands in the user agent 12, the channel bandwidth in the forward and reverse directions differs significantly, as much as a ratio of 100 (or more) to 1. This asymmetry also can exist in terms of processing power, memory storage and battery capacity between the messaging device 11 and the network 14.

For purposes of discussion, a short two-way messaging scenario is first described, followed by a more detailed description of various messaging system elements and their functions.

Figure 3:
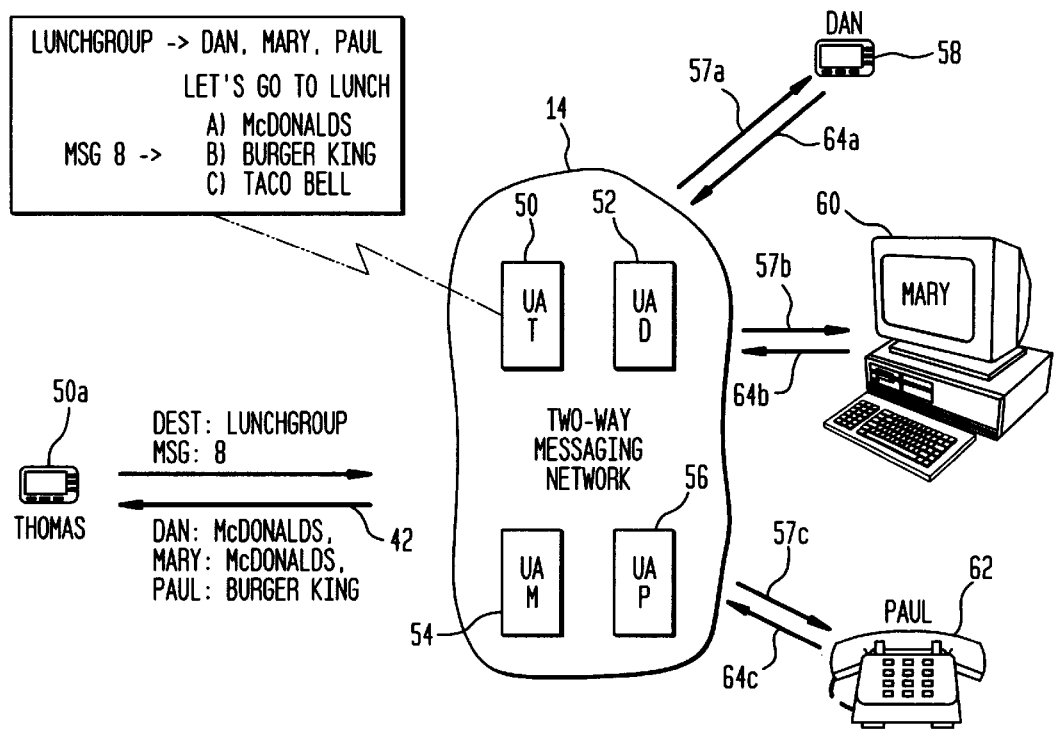
FIG. 3 is a more detailed view of the two-way wireless messaging system showing various user agents, the messaging network, and examples of messages that can be forwarded among the different subscribers.

Referring now to FIG. 3, there is illustrated the two-way wireless messaging system having four user agents for Thomas, Dan, Mary and Paul, referred respectively as UAT 50, UAD 52, UAM 54 and UAP 56.

Thomas can originate through his pager 50a a message to his lunch group members, Dan, Mary and Paul, and inquire about lunch choices. The message is delivered via the two-way wireless messaging network 14 along message delivery channels 57a (air interface), 57b (Data network interface), 57c (telephone network interface) as a page to a two-way messaging device in the form of a pager 58 belonging to Dan, an electronic mail to a computer 60 belonging to Mary, and a phone call to telephone 62 belonging to Paul respectively. The reply from each recipient is collected by the two-way messaging network 14 along a respective message return communication channel 64a, b, c and forwarded back to Thomas via the first communication channel 42 as a page. The type of message return communication channel 64a, b, c and message delivery channels 57a, b, c vary depending on the device, such as a pager 58, computer 60 or phone 62.

In accordance with the present invention, the uplink messages are kept short because of the use of the user agents 50–56. The user agents mirror the state and context (e.g., any address and message tables in the user agent) of their messaging devices 11 (FIG. 1), 50a, 58. In the above example, the uplink message contains a short group identifier and a message number. These are used by the user agents as indices to respective data tables in message expansion. For message reply, the uplink message contains only a reply code. This is expanded back to the full reply inside the network. By using group addressing, Thomas sends only one message uplink and the network automatically "copies" the message to the multiple recipients at the predetermined destinations.

Dan, Mary and Paul each receive the message in a different format, which could have been proposed by Thomas during message origination or specified as part of the filtering/forwarding criteria of the respective user agents of the recipients.

The criteria for filtering/forwarding can be very general. It could be based on the message originator, time of day, or any other commonly available forwarding options. Messages can also be formed in a variety of techniques. For example, Thomas can send the message as a pre-canned message with an embedded response. Thus, the message would include not only the text of the request, but would also include a list of responses to be selected and returned by the recipient.

Any user agent, e.g., those depicted as items 50–56, typically maintains, among other things, an identical copy of the address and message tables as the messaging devices. The address and message information stored in the messaging device and respective user agent should always be consistent with each other. Typically, to change these address and message tables, a subscriber needs to change one copy first and the system will propagate the changes to the other.

There are various methods a subscriber to the messaging system can use to enter new messages or addresses. There are chiefly two main categories, i.e., through the messaging device itself, or through the messaging system.

Figure 13:
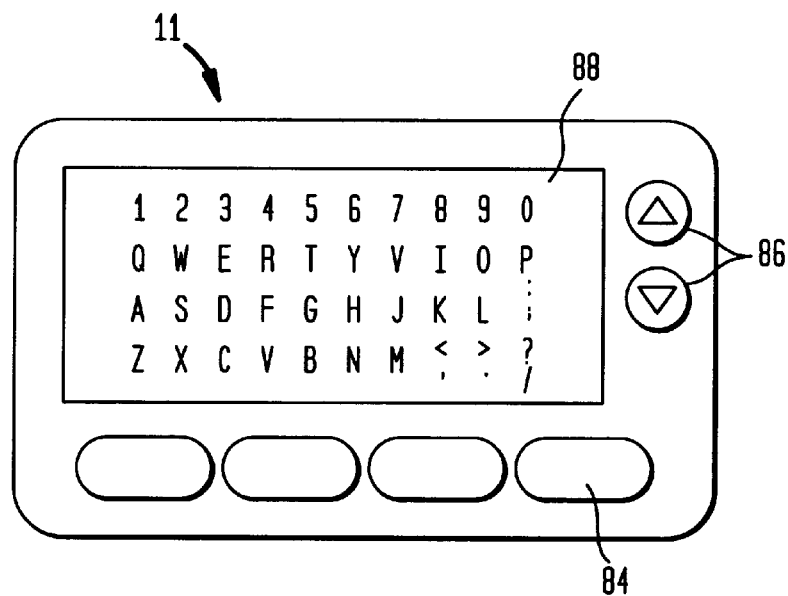
FIG. 13 shows a schematic illustration of a two-way messaging device where a simulated keyboard is displayed for entering a message.

For example, as illustrated in FIG. 13, the messaging device 11, e.g., a two-way pager, can include a simulated keyboard 69 displayed on the LCD screen 88. A subscriber uses the pager buttons 84 to navigate around the simulated keyboard and select characters to compose a message. This method is tedious and applicable more to short, fixed messages. This method is not practical for making flexible messages that contain dynamic components.

A subscriber can also elect to add an incoming message sent by others to its own set of messages. For example, the subscriber will receive an incoming message from another individual. The subscriber may like that particular message and through an appropriate selection of buttons on the messaging device 11, add that message to his or her own message list.

In still another method, many existing messaging devices such as pagers, have an input/output (i/o) port. This port could be used to connect to a laptop or a Personal Digital Assistant (PDA). A subscriber uses the laptop or PDA to edit messages and download them to the messaging device 11 via the input/output port. An appropriate protocol could be used.

The other major category is to use the messaging system for updating any new messages and addresses to the subscriber user agent. For example, new messages and addresses are directed to the user agent. This is one way to customize a subscriber's message and address set. The copy in the subscriber user agent is updated such as by using a dial-up program, an internet connection, a world-wide web page or even an operator to change the messages and addresses directly via wireline.

In still another method, the subscriber signs up for a new third-party service. When the subscriber initially signs for that service, the subscriber is given a set of messages and addresses that are used to access the service. These messages and addresses are then loaded directly into the subscriber's user agent by the service provider.

In the following, a more detailed description of a user agent 12 (FIG. 1) and its function relative to the two-way wireless messaging system 10 (FIG. 1) is set forth.

In accordance with the present invention, each subscriber of the two-way wireless messaging system 10 is represented by a user agent 12 that resides inside the messaging network 14. The user agent 12 expands coded originating messages received from a two-way messaging device and provides pointers to the last known location of the two-way messaging device 11. It also maintains the status of the two-way messaging device 11, i.e., if it is on-line, and a profile of the subscriber. The user agent 12 also can provide some value-added functions such as message screening and selective message forwarding. The user agent 12 may also be customized by its subscriber 40. Thus, the user agent 12 acts as a personal server for the subscriber 40.

The user agent 12 also provides other benefits. Because messages are expanded inside the messaging network 14, the bandwidth on the uplink can be reduced, allowing bandwidth asymmetry on the wireless link. By performing intelligent processing in the network instead of at the end device 11, the enhanced power of the network is utilized. The user agent 12 manages mobility by tracking the location of the subscriber. Finally, the user agent 12 serves as a proxy for the two-way messaging device 11 when it is out of range, allowing the system 10 to account for disconnected users.

Figure 11:
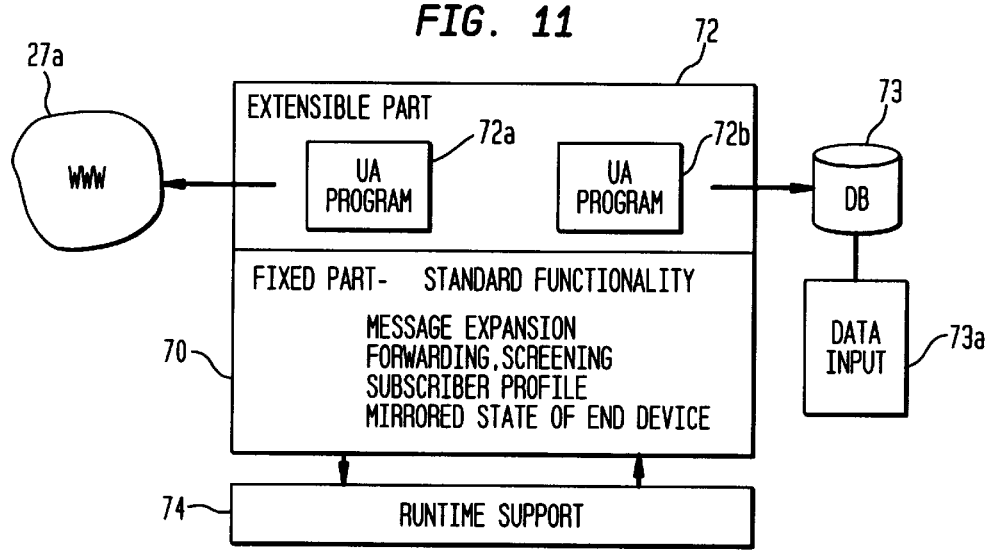
FIG. 11 is a schematic diagram showing an example of the functional parts of the user agent that can be used with the two-way wireless messaging system of the present invention.

As shown in FIG. 11, the user agent 12 can have respective fixed and extensible parts 70, 72. The fixed part 70 implements basic messaging functions that are generic for all user agents. It can mimic the context of a messaging device, (e.g., the address table and the message table) and maintains information about ongoing message delivery. The extensible part 72 includes user agent programs 72a, 72b, it can be programmed to perform specific tasks as desired by the subscriber 40 (FIG. 1), e.g., maintaining a personal calendar, retrieving specific information from a world wide web page 27a, a database 73, where data can be input 73a, or other similar functions. The software 74, is associated with the user agent program to provide run time support for the system.

These basic functions include registration/deregistration, message delivery and message status query.

Figure 4:
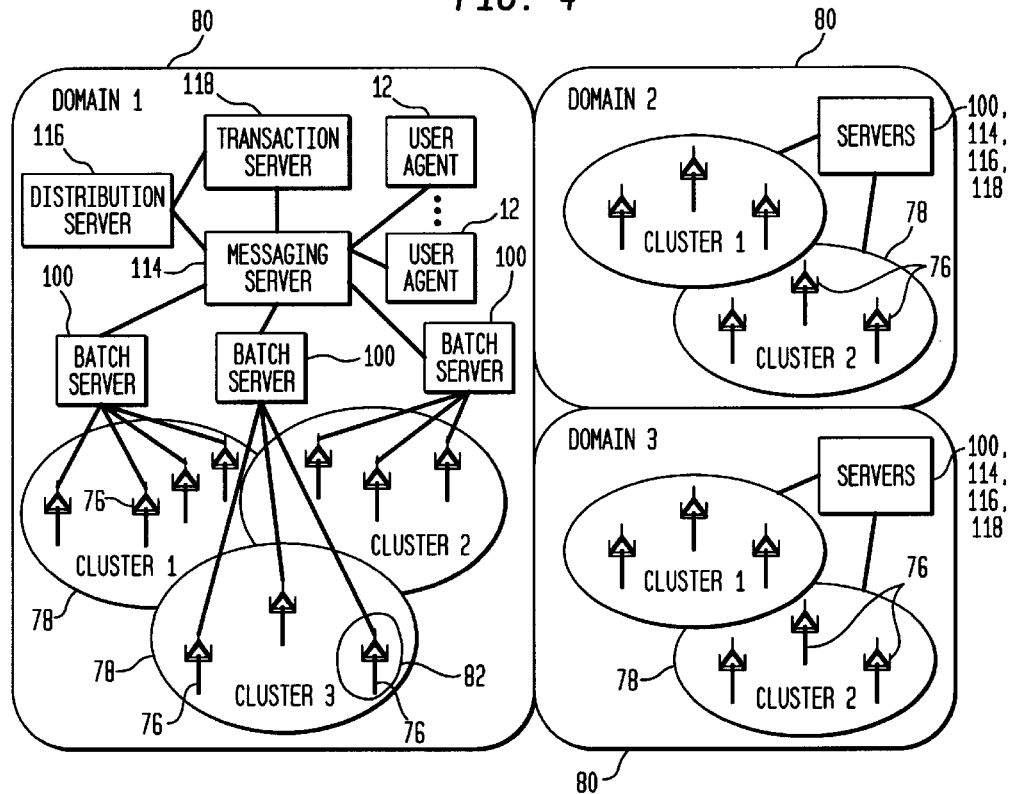
FIG. 4 is a schematic view showing the network architecture of the two-way wireless messaging system of the present invention.

In registration, the current location of the two-way messaging device is updated to the system as shown in FIG. 4. Registration can be explicit or implicit. Explicit registration occurs when a messaging device is powered-up or when it moves into a new cluster 78 (FIG. 4). Implicit registration occurs when a message is received or delivered to a messaging device. During power-up, the user agent 12 can also download messages that have been received in the messaging network 14 since the last power-down of the two-way messaging device.

The user agent 12 allows message delivery:

(1) when the device originates a new message;

(2) when the device receives a message;

(3) when the device replies to a message; and (4) when the device receives a reply.

Processing for groups 3 and 4 closely resembles that of groups 1 and 2.

When a messaging device 11 originates a new message, the user agent 12 translates the destination and reply address aliases sent by the device into the full address and expands the supplied message number and modifier into full message text and creates a record for the message. This record can be used as a basis for any subsequent message query. When a messaging device 11 receives a message, the user agent 12 returns the current status (on/off) and location of its device. Certain personal messaging functions, e.g., forwarding or filtering can also be performed.

For message status query, the query request is answered by the user agent by consulting its message record and if necessary, a transaction server is consulted about current delivery status, as will be explained later.

The extensible portion of the user agent specifies a framework in which additional functions can be added as user agent program modules 72a, 72b (FIG. 11). This collection of programs contain codes to handle messages of a specific pattern. The extensible part 72 follows an event-driven model and provides a kernel that pattern-matches incoming messages and dispatches them to an appropriate program module. Also, the extensible part 72 can be used for signaling by addressing a message to the user agent itself. For example, a message status query can be implemented as a signaling function in the extensible part.

Referring now to FIG. 4, there is illustrated a basic architecture of the two-way wireless messaging system 10 of the present invention. As illustrated, the system 10 includes a three-tier hierarchy. The highest is a domain 80; the cluster 78 is the middle; and the cell 82 is the lowest. The coverage area of a base station 76 defines a cell 82. A collection of adjacent cells 82 form a cluster 78 and a collection of clusters form a domain 80. Three domains are illustrated. A domain 80 is an administrative unit and each subscriber is associated with a unique domain called the "home domain". The various servers of the present invention 10 are replicated in each domain 80 and the user agent of a subscriber resides and is managed by its home domain. For purposes of description only one single domain is described. This hierarchy is designed for several important principles in the present invention:

(1) limiting the control information transmission;

(2) limiting the size of transmitted messages; and (3) distributing functions in a modular manner.

To limit the transmission of control information by a two-way messaging device 11, the amount of periodic signaling is reduced. For example, location updates can be minimized by defining the registration area to be a cluster 78. Thus, the two-way messaging device 11 only re-registers with the system 10 when it crosses cluster boundaries. This can reduce the amount of signaling traffic, especially in a microcell infrastructure with high subscriber mobility. Thus, the messaging network only knows the location of a messaging device to the resolution of a cluster 78, and a limited search is necessitated to locate a device 11 before message delivery.

A small cluster 78 size provides better precision of device location and a smaller messaging delay at the expense of more frequent updates. A larger cluster size, on the other hand, increases average messaging delay but requires less frequent updates. To obtain an optimal cluster size, both message arrival rate and mobility pattern should be considered.

Figure 9:
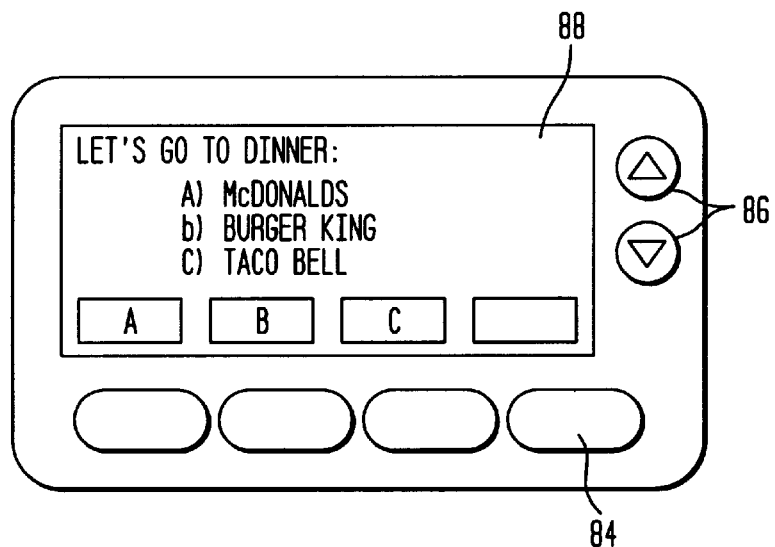
FIG. 9 is a schematic diagram of a two-way messaging device in the form of a two-way pager that can be used with the two-way wireless messaging system of the present invention.

Referring now to FIG. 9 there is illustrated one example of a messaging device that can be used with the present invention. It is illustrated as a dedicated, stand alone two-way pager 11. In this example, the messaging device 11 generates, receives and displays messages to the subscriber user. The design of the messaging devices must take into account important hardware limitations, such as the need for minimum power consumption. As illustrated, the messaging device 11 should be business card size to provide the portability required of "any time, anywhere" service. The power consumption should be minimum, requiring infrequent battery change.

FIG. 9 shows a representative schematic of a pager 11 having four function buttons 84 at the bottom serving as soft keys, i.e. keys whose functions vary with the contexts, and two buttons 86 on the side, used mainly for scrolling purposes. The two-way pager includes a 5-line LCD screen 88 in which the top four lines are used for text while the bottom line shows current bindings for soft keys. The pager contains computing hardware, e.g., a processor and memory for user interface code and pager protocol. A low power general purpose microprocessor can be used for the pager. Memory should be adequate enough to contain these various messages and associated data.

As shown in FIGS. 2 and 4, a base station 76 terminates the air interface and a link layer protocol with the pager 11. It manages the air interface resources. Base stations 76 can be deployed as cellular base stations, packet radios or other types of transceivers as required for any wireless messaging and paging systems.

Referring now to the general overview of FIGS. 4. and 5, there now follows a description of the various servers used with the two-way wireless messaging system of the present invention.

A batch server 100 provides intelligence to base stations 76. A single batch server 100 connects to one or more base stations 76, and receives and acknowledges messages from the messaging device 11. It also receives messages destined to a messaging device, forwards them to the proper base station 76 for delivery, and receives acknowledgements that the messages have been correctly received. The batch server 100 may batch downlink pages into groups for scheduled delivery to allow sleep mode operation of pagers. In essence, a batch server 100 acts as a point of transfer between the wired (network) and the wireless (subscriber and base station) portions of the system 10. It is responsible for relaying uplink messages from subscriber devices (via base station 76) to the network and downlink messages from the network to subscriber devices (via base stations 76).

Figure 6:
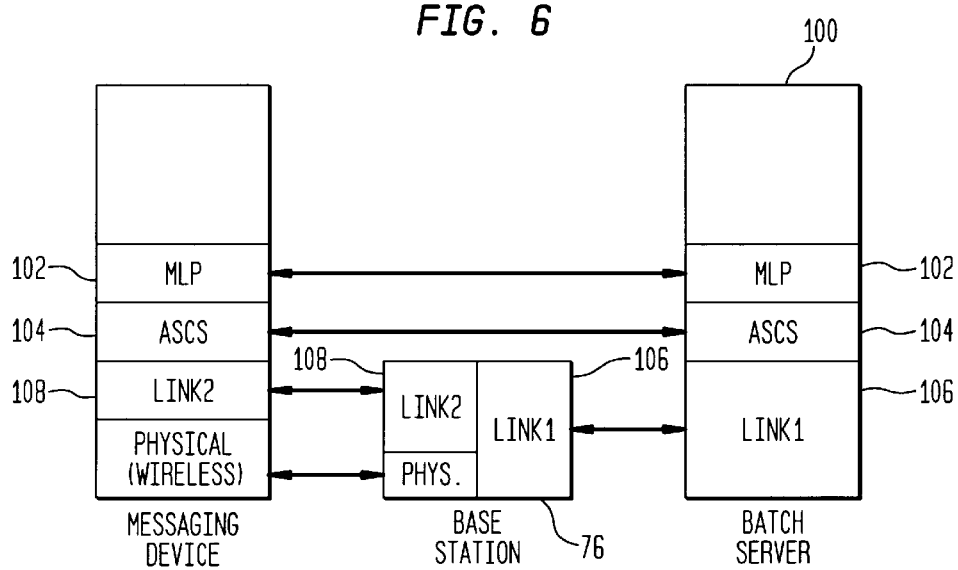
FIG. 6 is a block diagram showing an example of the protocol architecture used between the messaging device and the batch server of the two-way wireless messaging system of the present invention.

A protocol structure that can be used for interactions between the pager 11, base station 76, and batch server 100 is shown in FIG. 6. The Message Layer Protocol (MLP) 102 is responsible for ensuring reliable message delivery between the batch server 100 and a messaging device. Each MLP 102 data unit contains one user-level message. At most one message per messaging device may be outstanding at a time. The sending entity of a message maintains a retransmission timer for the outstanding message, and retransmits the message until it receives an acknowledgement. Acknowledgments are generated by the receiving MLP entity when a message is correctly received.

The Airlink Specific Convergence Sublayer (ASCS) 104 operates peer-to-peer between the batch server 100 and the messaging device 11. The ASCS 104 is responsible for segmenting MLP 102 data units into the appropriate size for transmission over the air interface, and re-assembling air interface frames into MLP data units at the receiver. ASCS 104 passes only correctly received data units to an MLP; any corrupted data units are silently discarded. The ASCS protocol specification is dependent on the air interface protocol, and as a result, many different ASCS's will exist.

Two link layer protocols 106, 108 are illustrated. LINK1 106 operates between the batch server 100 and the base station 76. LINK2 108 operates over the air interface and is specified by the particular air interface used in the system 10.

Figure 10:
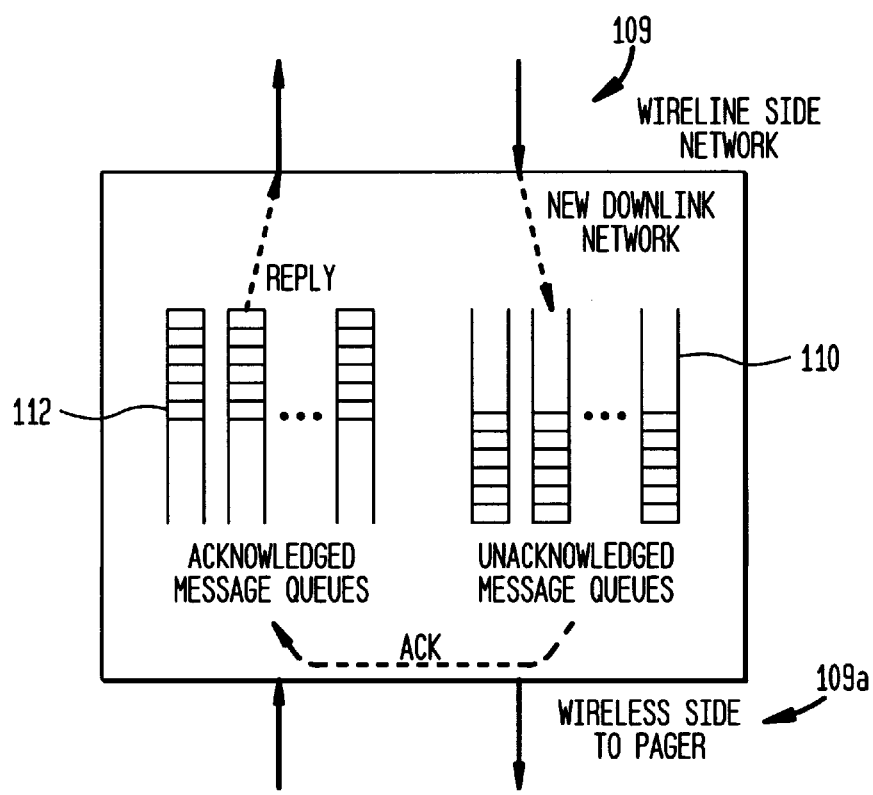
FIG. 10 is a schematic diagram of an example of the batch server structure that can be used with the two-way wireless messaging system of the present invention.

The high-level structure of a batch server is shown in FIG. 10. It maintains a number of data structures for its operation such as a registered messaging device table, which maintains a record for each messaging device currently being served by the batch server. The record includes both information about the messaging device (i.e., last base station visited) as well as traffic statistics (e.g., number of uplink/downlink messages from/to a messaging device). The wireline (network) side is indicated generally at 109, and the wireless (subscriber and base station) side is indicated generally at 109a.

A record is created in the registered messaging device table under two circumstances: an explicit registration or an implicit registration. An explicit registration in turn is performed under two conditions: power up initialization or cluster boundary crossing. The former is a new registration while the latter is a re-registration. A re-registration requires the additional step of deleting the state information kept in the old batch servers. An implicit registration, on the other hand, occurs when a base station receives a data message from a messaging device not currently registered. This is often the result of an active messaging device moving between cells in a cluster, and then sending or receiving a message. The record is deleted when a power-down deregistration is received.

Another data structure is Unacknowledged Message Queues (UMQs) 110, which contain messages that are to be delivered on the downlink. They are logically organized on a per messaging device basis, though the actual implementation may be based on separate queues or a common message pool. The batch server 100 uses a stop-and-go strategy in delivering the messages, i.e., it will not deliver a new message to a messaging device 11 until the previous message to the messaging device has been acknowledged. Thus, at any particular time, there is at most one outstanding unacknowledged message.

When an acknowledgement is received from a messaging device, the acknowledged message (i.e., the message at the head of the queue) is moved to the Acknowledged Message Queue (AMQs) 112. The acknowledgement is designed to be short; it contains only a so-called receive buffer index (rbi), which is a locally unique (relative to the destination pager) identifier. The rbi is used later to correlate the reply to the original message.

Another data structure is the Acknowledged Message Queues 112, which contain messages whose delivery has been acknowledged by the destination messaging devices and are currently awaiting their replies. A reply contains an rbi together with a reply code. The rbi is used to retrieve the original request; it serves essentially as a local message id, thus eliminating the need to send the system message id uplink. The reply code encodes the desired response, and is to be expanded by the replier's user agent.

Generally, the length of these queues is small because replies tend to follow the acknowledgements closely, in the order of about 30 minutes. A procedure could exist and be implemented by one skilled in the art to migrate the state back to the user agent if a reply does not come within a certain time limit. Thus, the AMQs behave like a cache for storing message information needed in processing a reply.

Depending on the air interface, the batch server 100 may also be responsible for other low-level tasks. These include the delivery of packets using a multicast operation. There are two possible forms of multicast delivery: 1) true and 2) ad-hoc. In a true multicast, messaging devices belonging to a multicast group share a single multicast address and messages are delivered using the multicast address. In an ad-hoc multicast, an address header message containing a list of destination device ID's is first sent to alert the receiving messaging devices. This is then followed by the actual body of the message.

Figure 5:
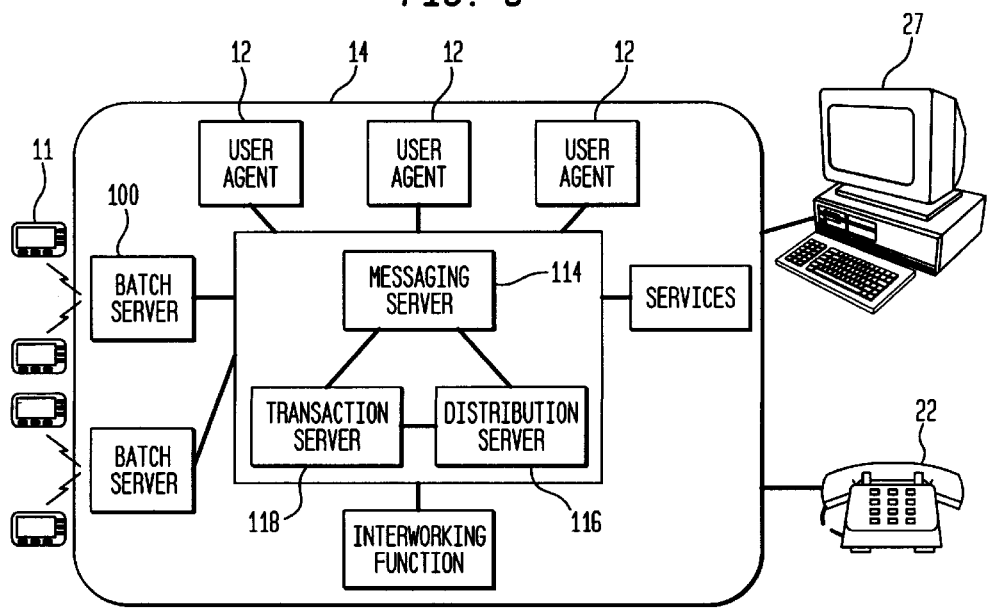
FIG. 5 shows an example of the control architecture for the two-way wireless messaging system of the present invention.

Referring again to FIGS. 4 and 5, there is illustrated a messaging server 114, which enhances the modularity of the system by coordinating activities of individual servers. The messaging server 114 receives originating messages, coordinates with other servers to determine their location and format in which the message should be delivered, invokes value-added services and finally routes the messages to a server which can deliver them. The messaging server 114 functionality is required in all messaging systems and its operation varies depending on the intelligence and value-added services available from the messaging system.

The distribution server 116 is responsible for delivering messages to their final destinations in the proper format. For messages to be delivered to a wireless device such as a pager 11, the distribution server 116 executes a direct paging algorithm based on location information provided by a user agent 12. For messages that are to be translated into a different format, the distribution server 116 routes the message to a translator. The distribution server functions are basically required in the system 10. If the system 10 does not make use of location information, but floods the air interfaces with messages to be delivered (true broadcast), the distribution server function is minimal.

The distribution server 116 works in conjunction with a user agent 12 that supplies location information, and manages user mobility in the present invention. The distribution server 116 forwards any message to be delivered to the batch server 100 that was last known to have been serving the messaging device, such as a pager 11 or other wireless device. If the batch server 100 successfully delivers the message, the distribution server 116 receives an acknowledgment and the algorithm terminates. If the batch server times-out, the distribution server 116 will forward the message to all batch servers 100 which neighbor the original target batch server. This increases the coverage area in which the message delivery is attempted. The message is not sent to the original batch server on the second delivery attempt. If the message is still not delivered, the coverage area is increased again, sending to neighboring batch servers 100 of the latest subset until the message is delivered.

This algorithm has several benefits. First, no single batch server 100 is included twice in the search. Second, while the distribution server 116 performs directed paging on a cluster area, the batch servers 100 may execute a directed paging algorithm among the base stations 76 within the cluster 78. This distributed control allows base stations 76 to be added to clusters without requiring the distribution server 116 to change its directed paging algorithm search lists. The directed paging algorithms of the system 10 are designed to reduce both the air and network traffic in the paging system 10 when compared to the flooding techniques employed by many paging systems in operation today. Many variations of this basic algorithm are possible to those skilled in the art.

The transaction server 118 (FIGS. 4, 5 and 12) tracks the transactions between messaging subscribers. This involves correlating messages, replies, and acknowledgments. The transaction server 118 supports several transaction types, reports the status of transactions when requested, and closes transactions when complete. It supports one-to-one and one-to-many transactions. For example, a subscriber 40 (FIG. 2) may send a message to three endpoints and request that it be only notified of the first response. In this case, the transaction server 118 will open a transaction when the message is sent, and close it when the first reply is received. Any further replies will be discarded. If a system does not support transactions, the transaction server 118 is not a required element.

In the system of the present invention, the transaction server 118 supports the following basic transaction types which may be combined to form a more enhanced set of transaction services:

1. All-reply
2. N-reply
3. Timed-reply

The all-reply transaction remains open until a reply has been received by every message recipient. The N-reply transaction remains open until a reply has been received by N message recipients. The timed-reply transaction remains open until a user specified time has expired. Once a transaction is closed, further replies are not accepted and not forwarded to the transaction originator. For example, in a transaction in which only the first three replies are accepted within five minutes, if either five minutes elapses, or three replies are received, the transaction is closed. This is an example of combining the N-reply and Timed-reply transaction types. All transactions are subject to a system timer which is used to close transactions that have not been completed within a reasonable amount of time.

Figure 12:
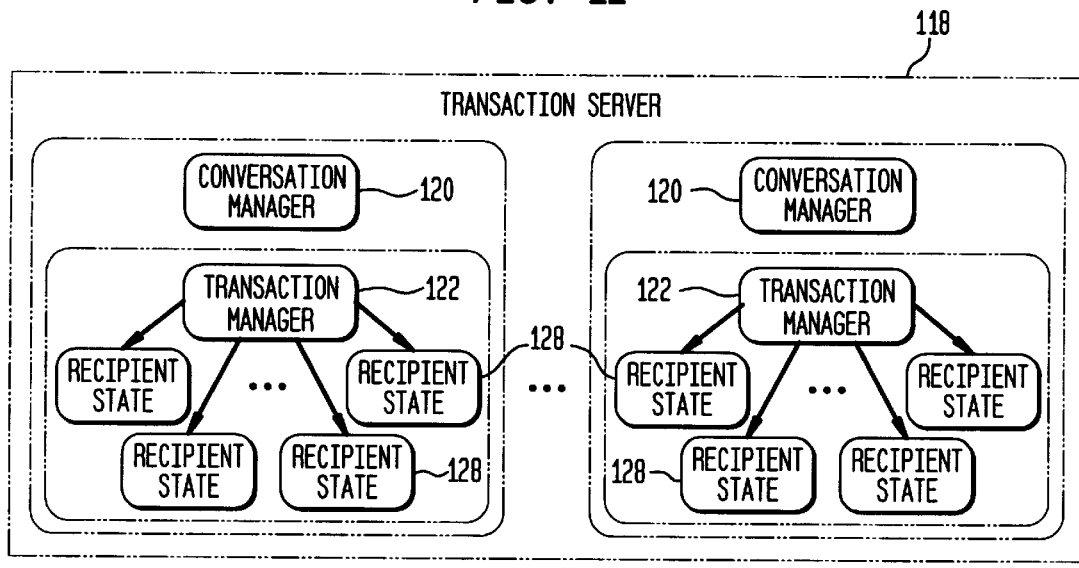
FIG. 12 is a schematic diagram showing an example of the various functions of the transaction server that can be used with the two-way wireless messaging system of the present invention.

A schematic diagram of one example of the structure of the transaction server is shown in FIG. 12. As noted before, the transaction server 118 supports three basic transaction types: all-reply, N-reply, and timed-reply.

Figure 12A:
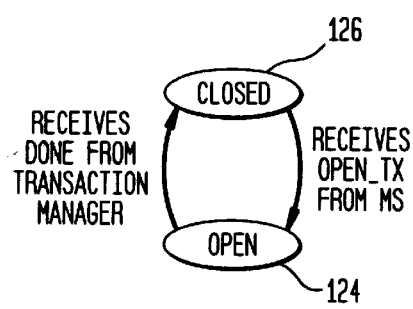
FIG. 12a depicts the open and closed states of the conversation manager.
Figure 12B:
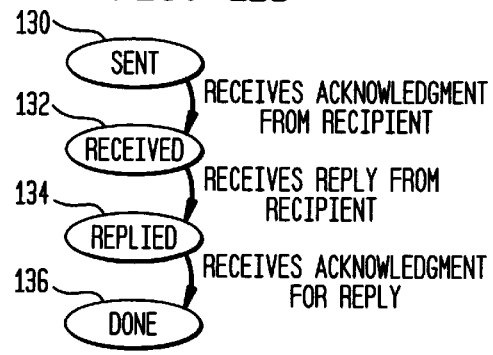
FIG. 12b depicts the state transition diagram for the recipient states of the transaction server.

As shown in FIG. 12, the transaction server has two levels of hierarchy: a conversation manager 120 and a transaction manager 122. The conversation manager 120 maintains a simple two-state machine as either open 124 or closed 126 (FIG. 12a). If a transaction is open, replies to the original message are expected and accepted. If the transaction is closed, no replies are accepted. The transaction manager 122 is responsible for tracking the state of each recipient involved in the transaction, and thus determine if a transaction should be closed. The transaction manager makes this decision based on the number of replies that are being accepted for a transaction, and the number of recipients 128 that have reached the done state as shown in FIG. 12b. When the proper number of recipients are in the done state, the transaction manager informs the conversation manager 120 to close the transaction.

Consider a simple transaction with three recipients. The transaction server receives an OPENTX (open transaction)

request from the messaging server 114, and assigns a unique transaction ID to the transaction. It then initiates a conversation manager 120 to handle this request. The conversation manager 120 is indexed by the transaction ID. The conversation manager 120 transitions into its open state and initiates a transaction manager 122. The transaction manager 122 creates three records, one for each recipient, to reflect the recipient states. The records are indexed by the recipient address. The initial states are the states labeled by "sent", signifying that the message is being sent to all three recipients.

The transaction server 118 also stores information concerning the transaction type. For example, the transaction server 118 determines from the transaction type how many replies should be accepted for the transaction. The transaction server also sets a deadline timer by which time the transaction must be closed. If the transaction is not a timed transaction, a default system timer, typically on the order of a day, is used. At this time, the transaction server 118 replies to the messaging server with the transaction id.

As acknowledgements and replies are received from the message recipients, the conversation manager 120 maintains the transaction in its open state. The transaction manager 122 modifies the state of each corresponding recipient. As acknowledgements are received for the replies, the transaction manager 122 will transition the appropriate recipients to the done state. Depending on the number of replies allowed for the transaction, the transaction server 116 determines if more replies should be accepted. When the reply limit is reached, i.e., the required number of recipients have reached the done state, the transaction manager 122 instructs the conversation manager 120 to close the transaction. The transaction manager 122 may also instruct the conversation manager 120 to close the transaction if the transaction time has expired.

After this time, any replies received by the transaction server 118 are rejected. The transaction server sets a record timer. Until the timer expires, the state of the conversation manager is frozen in the closed state, and recipient states are frozen. During this time, the transaction server 118 may be queried as to the state of the transaction. When the record timer expires, the transaction server 118 deletes the conversation manager 120 and transaction manager 122 for the transaction. Any queries to the transaction server 118 after this time will result in an invalid transaction ID message.

A simple routine flow chart is shown in FIG. 12b and illustrates message transmission and acknowledgements. A message is sent 130 and acknowledgement received 132. A reply is received from the recipient 134 and then the sequence is done 136 when the acknowledgement is received for a reply.

The two-way wireless messaging system 10 with the present invention allows various types of messages. Unlike many existing paging and messaging systems which support primarily static messages, or require dictations, the present invention supports flexible message types. The design of these message types is strongly influenced by the capability of the messaging device. For example, the lack of a keyboard implies that free form messages are impractical. Also, as many of the advanced features are processed locally by the messaging device, the device must be sophisticated enough to handle the processing logic.

The most basic type of supported message is fixed pre-canned messages. This is identical to what is currently available under one-way alphanumeric paging. A simple extension of fixed pre-canned messages is the so-called richtext messages. It adds text attributes, e.g., bold face, inverse video, etc., to the plaintext of a fixed pre-canned messages. Fixed pre-canned messages suffer from a major limitation, namely, they cannot be dynamically customized. To overcome this, the present invention introduces three types of dynamic components: 1) optional components, 2) selections and 3) pre-defined variables. Optional components delineate message parts that can be dynamically included or excluded. A selection provides a list of items from which to choose. For example, a selection labeled "location" may expand into the list of choices: a) home, b) office, or c) lab. The set of available selections are defined by the individual subscribers. Pre-defined variables represent specific commonly used entries that can be customized by a user. Typical examples of pre-defined variables are time, phone number, etc. Dynamic components can be nested as needed.

To facilitate a reply, a message can include reply components. A reply component embeds the desired replies, typically making use of dynamic components. This is useful in applications where the possible replies are agreed upon a priori.

The most general message type includes conditional components. A conditional component can be conditionally included or excluded based on the values of previous dynamic components. It can be used to chain multiple messages together, thus eliminating the roundtrip delay. They are intended only for the most advanced messaging applications.

Described below is an example of a protocol flow for a multicast message delivery with replies. Focus is directed on the salient features of the system.

Figure 8:
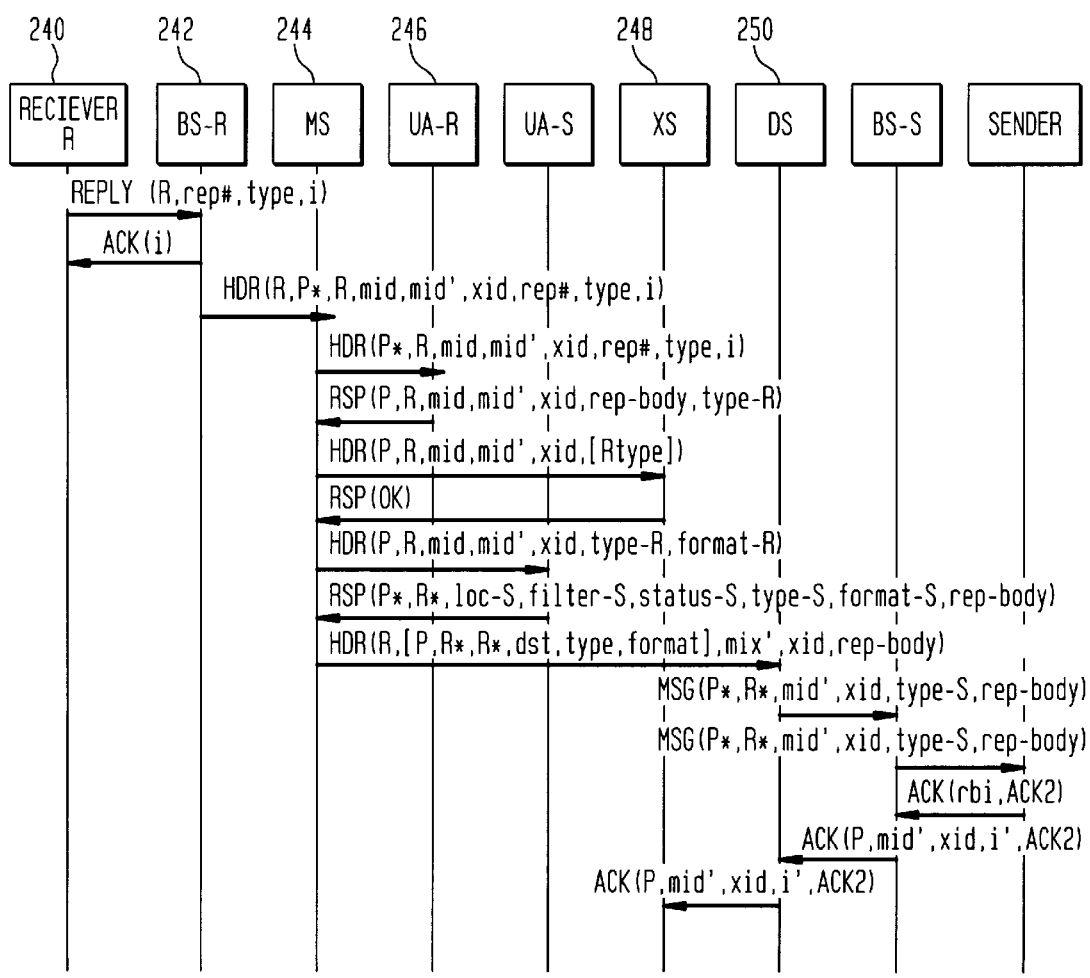
FIG. 8 is a detailed flow diagram showing an example of the reply delivery in the two-way wireless messaging system of the present invention.

In the example, presented in FIGS. 7 and 8, a subscriber S 200 sends a message to three recipients, R1 202, R2 204, and R3 (not shown). In this example, R1 last registered at BS-R1, 222 and is still currently in BS-R1. R2 last registered in BS-R21, 230, and has since moved to BS-R22, 232. R3 is currently inactive, i.e., power off. R1 202 receives the message on its messaging device in the first delivery attempt. R2 204 receives messages on its messaging device on the second delivery attempt. R3 requests that the message be forwarded to a message storage server for subsequent retrieval. In the following, we illustrate the function of each entity, the location management procedures of the system, and a direct paging algorithm. The interaction with individual base stations is not included in this example. It is assumed that there is a one-to-one mapping between base stations and batch servers for simplicity.

FIG. 7 shows a highly schematic depiction of message delivery procedures. The originator of the message, S 200, transmits its message into the network through its serving batch server, BS-S 208, via a PG2BS-NEW message. This PG2BS-NEW contains the address of S, an array of recipient addresses, an array of reply-to-addresses, and the coded message. In this example, the recipients listed are R1 202, R2 204, and R3 206, and the reply-to-address is the address of the message originator, S 200. The message is coded by indicating a message number and any dynamic component values. BS-S 208 receives the message, and generates an acknowledgment back to S 200, BS2PG-ACK (shown by the reversed arrow), signifying that the network has accepted the message for delivery.

The batch server 208 forwards the message to the messaging server, MS 210, in a BS2MS-NEW message. In addition to the information contained in the PG2BS-NEW message, this message contains a message identifier (mid), which uniquely identifies this message throughout the system.

The messaging server 210 contacts the user agent of the message originator, UA-S 212, with a MS2UA-NEW message. UA-S 212 performs the message expansion function. It expands the message body depending on the message number and dynamic component values received and expands any address aliases into the full system addresses. UA-S 212 responds to the messaging server 210 with the message body and the message type, i.e., an indication if this message requires a reply, if it is part of a transaction, or if it is a simple one-way page. In this example the message is classified as a transaction in which replies from all recipients are required. This information is sent in the UA2MS-NEW message.

As this point, the messaging server 210 contacts the user agents of the message recipients to determine the location of their corresponding messaging devices, the format in which they wish to receive the message, and their status. It does this by sending HDR messages to the user agents. The user agents respond with the status and last known location of the messaging devices. In this example, UA-R1 214 responds that the messaging device is active, and that its last known location is BS-R1. UA-R2 216 responds that the messaging device is active, and that its last known location is BS-R21. UA-R3 218 responds that its pager is off, and that the message should be forwarded to a message storage server.

The messaging server 210 receives these replies, and then requests that the transaction server 220 open a transaction for this message exchange via the OPENTX message. The transaction server 220 opens the transaction, and returns a transaction ID in the TXRSP message. The transaction ID uniquely identifies this transaction throughout the network, and furthermore, identifies the transaction server 220 managing this transaction. The transaction ID is forwarded to the user agent 212 of the message originator (TXUPDATE) so that it may access the transaction record if it later receives any queries as to the status of the transaction.

The messaging server 210 then forwards the full message body, along with the list of recipients, their desired message formats, and last known locations to the distribution server 221 (MS2DS). The distribution server 221, based on the location information provided, and the desired format of the message, determines how to deliver the message to the recipients. It forwards the message to R1 202 via BS-R1 222, and the message to R2 204 via BS-R21 230, as instructed by the location information received. It forwards the message for R3 to the message storage server, MSS 224.

BS-R1 222 delivers the message to R1 202 (MSG), and eventually receives an acknowledgement (ACK). The batch BS-R1 222 server forwards this acknowledgement to the distribution server 221, which forwards the acknowledgement to the transaction server 220. The transaction server 220 updates its transaction record.

Likewise, an acknowledgement is received from the message storage server 224 on behalf of R3. This acknowledgement is also forwarded to the distribution server 221 and transaction server 220. In addition, the distribution server 221 updates UA-R3 218, notifying it of the retrieval ID by which the user may retrieve the message from storage at a later time (UPDATE). The retrieval ID is downloaded by UA-R3 218 to R3 when R3 powers on.

The batch server BS-R21 230 does not receive an acknowledgement for R2 204, and therefore times-out. It generates a negative acknowledgement to the distribution server 221 (NACK). The distribution server 221 executes the directed paging algorithm in which it expands the message delivery area to all batch servers neighboring the original target. In this example, these are BS-R22 232 and S-R23 234. BS-R22 232 successfully delivers the message and receives the acknowledgement. The acknowledgement is forwarded to the distribution server 221 and transaction server 220. The distribution server 221 updates UA-R2 216 so that it may reflect the current location information of R2 204. It is through this interaction between the distribution server and user agents that the approximate location of the wireless messaging devices is learned, and the direct paging algorithm is executed.

At this time, the message has been delivered to all recipients, and the transaction is open.

FIG. 8 shows the flow for the reply to a message generated above. At a high level, the reply flow is symmetrical to the message origination flow. In this example, the recipient, R 240 generates the reply (REPLY), which is received by batch server BS-R 242. The reply is again a coded message, with an identifier to associate it with the original message. The batch server 242 caches information about messages it delivers for a finite time. If the reply is received by the batch server 242 within that time period, it can determine the full message ID, transaction ID, and other ID's, from a local identifier. If the information has been removed from the cache, or if the wireless messaging device has moved to a different batch server area before sending its reply, the batch server 242 must fetch the information from the user agent of the wireless messaging device sending the reply.

As in the message origination case, the batch server forwards the message to the messaging server 244 which contacts the user agent of the replying device 246. The user agent 246 expands the reply, and returns the message to the messaging server. The messaging server 244 then contacts the transaction server 248 to notify it that a reply has been generated. If the transaction is still open, and more replies are still being accepted, the transaction server 248 instructs the messaging server 244 to continue delivering the reply, as in this example. The remaining portion of the reply delivery flow is similar to the message delivery flow: the user agent 246 of the device receiving the reply is contacted to determine where to deliver the reply, and the reply is sent to the distribution server 250 for delivery.

When the acknowledgement for the reply is received by the distribution server 250, it is forwarded to the transaction server 248.

The two-way wireless messaging system with the present invention can be used with more than the above-illustrated examples. For example, it is conducive for dispatching where a dispatcher may transmit a message to a group of recipients in order to assign a task. For example, a maintenance supervisor can send a message to all shift workers if an outage occurs. The message recipients respond upon receiving the message indicating their availability. The supervisor may then assign a job to one or more members of the group.

Additionally, the two-way messaging system can be used as a calendar reminder service where reminders and alarms are generated by a network-based calendar server with the help of subscriber user agents. The messaging devices are portable, and messages can be delivered to a pager, E-mail and other messaging device. The calendar can act somewhat as an "alarm" and notify a user at any time of scheduled appointments, anniversaries and important dates. Appointments can be entered into the calendar as part of the user agent.

Additionally, the system can be used for emergency signaling and sending a S.O.S. message. In an emergency signaling system, a person in distress can send an S.O.S. message. This message is routed to an emergency command center. The network can indicate the location of the sender of the message using a location-based service system. The emergency command center may send messages to the person in distress to perform an initial evaluation of their condition through the use of query messages. For example, messages such as "Are you injured?", "Are you bleeding?", or "Can you move?" may be sent with reply choices. Answers collected from the initial evaluation can be extremely useful in dispatching the proper emergency response units.

Upon finishing dispatching (via a separate two-way message multicast as described earlier), an acknowledgment such as "Help is coming" or "Please meet the ER people at the next block" can be relayed back to the person requesting emergency help.

Depending on the subscriber's profile, a follow-tip notification via two-way messaging could be sent to the family members of the subscriber.

This service takes advantage of the reliability, bidirectionality, multicast, and transaction support of the two-way messaging system.

Additionally, messages may be directed to subscribers in a certain location. For example, if the trains in New York are not running, all people in New York may be sent a message. This service is similar to current simple paging services except that it is location dependent.

Figure 14:
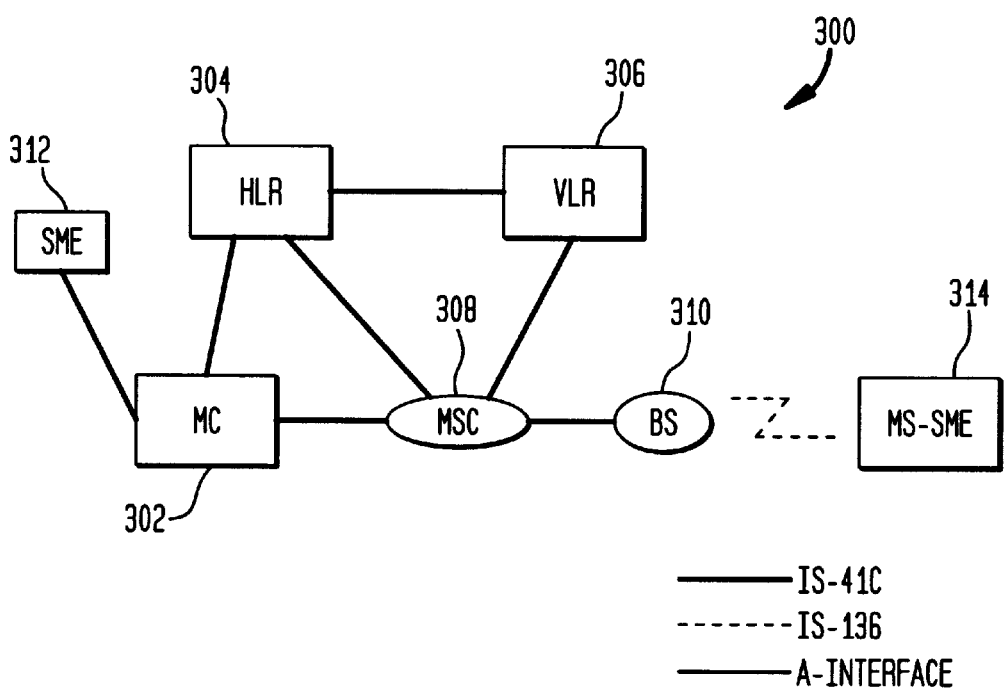
FIG. 14 shows a simplified block diagram of various components of the two-way messaging cellular system specified by standards.
Figure 15A:
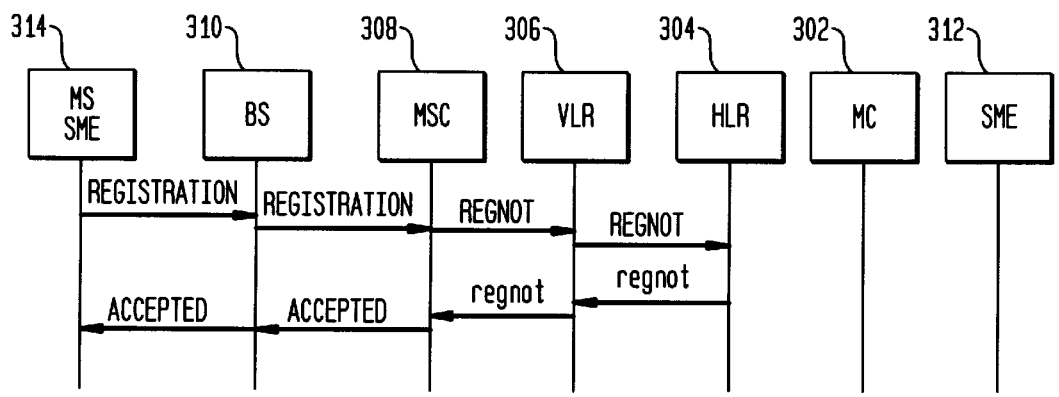
FIG. 15a shows the basic message flow in a conventional system upon registration of a mobile messaging entity.
Figure 15B:
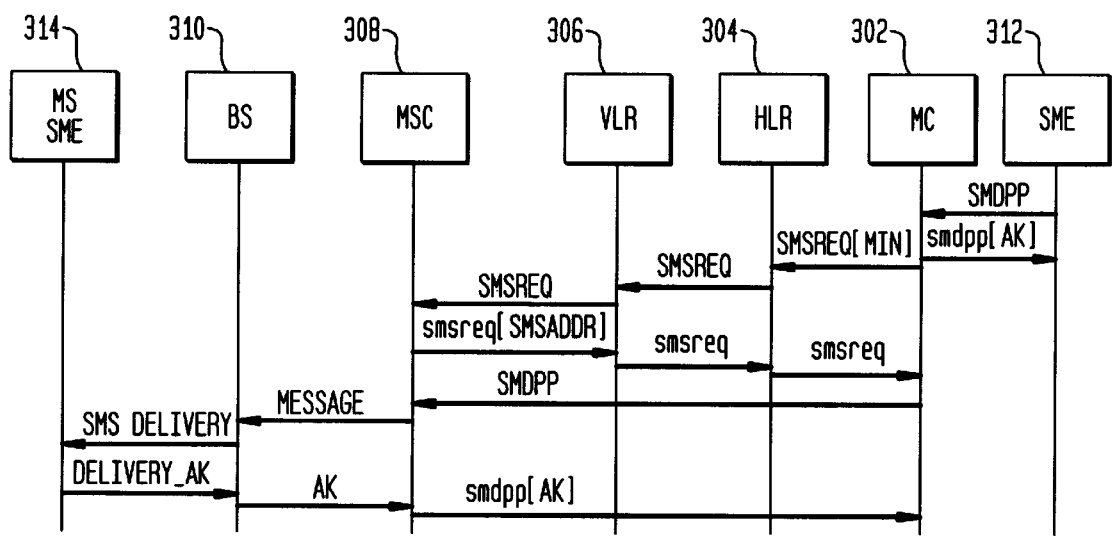
FIG. 15b shows a flow diagram for message delivery to a mobile messaging entity.
Figure 16:
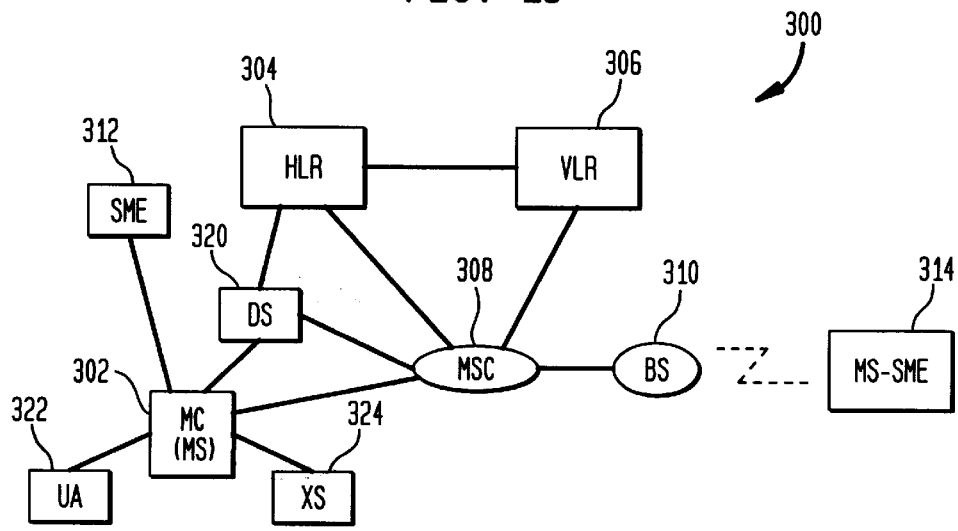
FIG. 16 shows another simple block diagram of a two-way cellular messaging system having a user agent and transaction and distribution servers of the present invention.
Figure 17A:
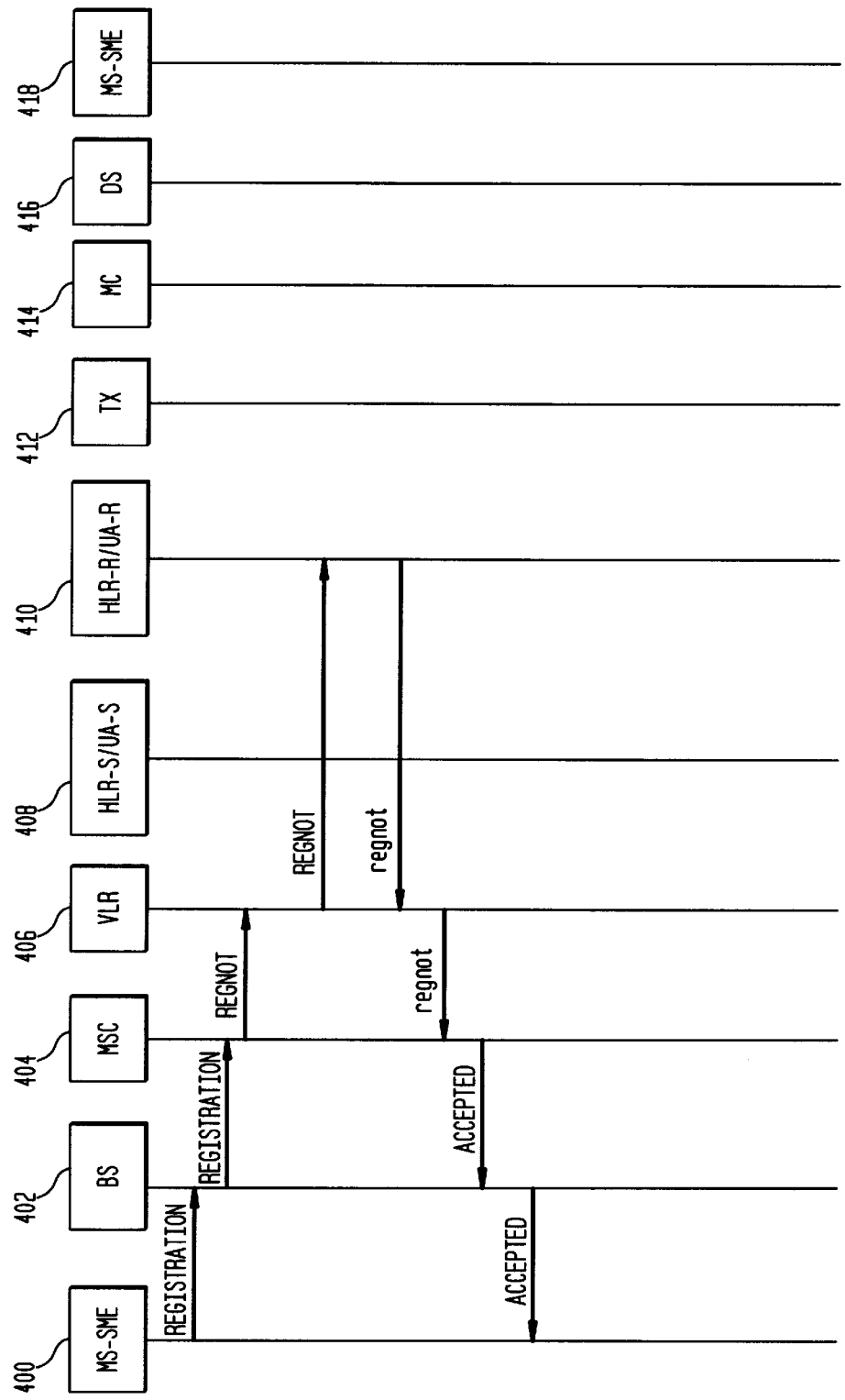
FIG. 17a shows an example of the basic message flow in the system of the present invention.
Figure 17B:
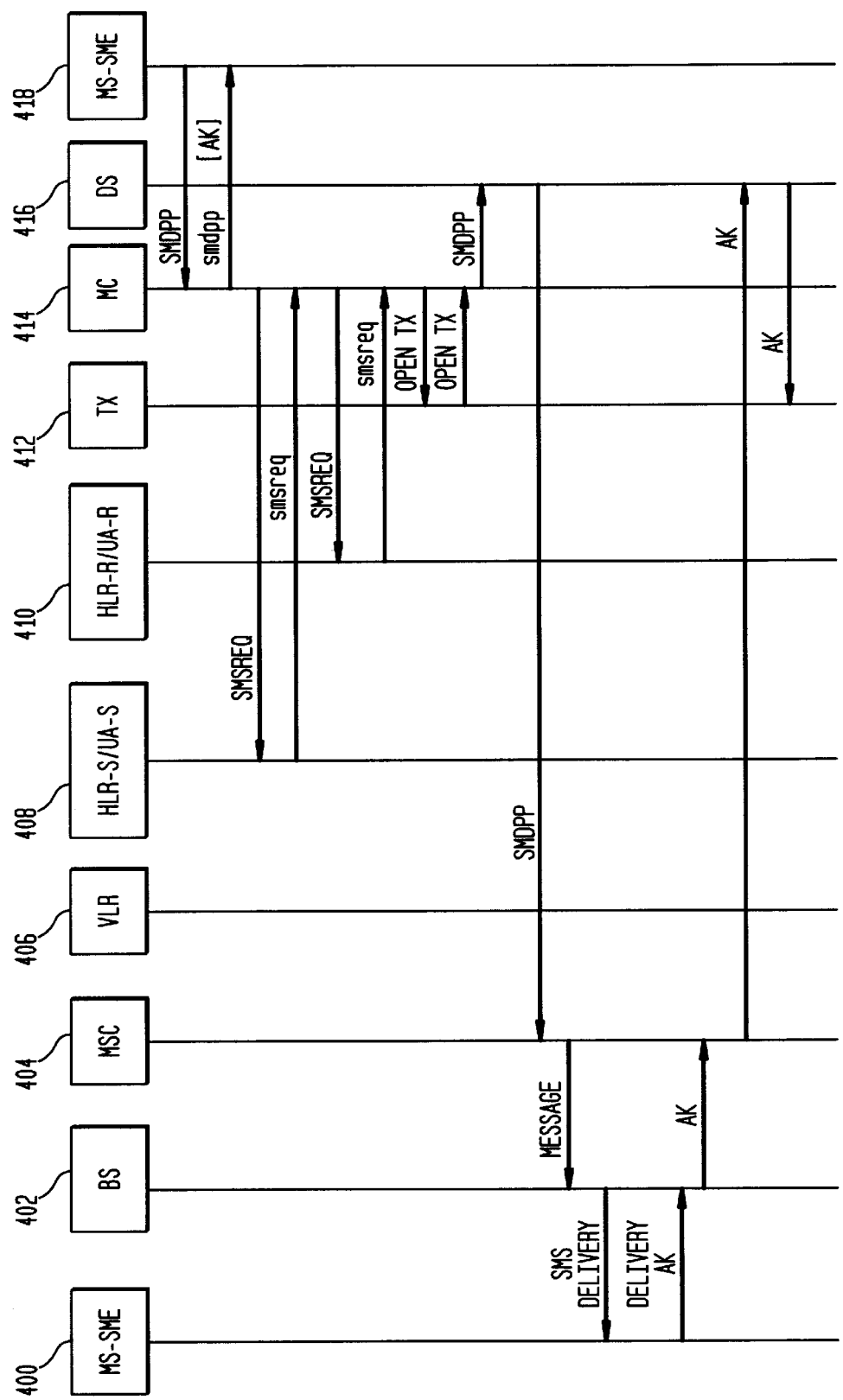
FIG. 17b shows an example of the basic message flow for message delivery to a mobile messaging entity of the present invention.

Referring now to FIGS. 14, 15a and 15b, there are illustrated embodiments of a more conventional two-way wireless cellular messaging system based on standards that explains the basics of a cellular system. FIGS. 16 and 17a, 17b illustrate the use of servers and user agent of the present invention in association with a cellular system.

As illustrated in FIG. 14, a cellular system is illustrated generally at 300 and uses an IS-136 air interface between base stations and mobile messaging entities, and an IS-41C network node interface. The IS-136 air interface is a digital cellular air interface standard that supports functions such as mobile registration, paging to deliver calls, call origination, handoff, telephony service and exchanges messages as part of a messaging service. The IS-41C network node interface is network protocol that operates between cellular mobile switching centers, various databases used for mobility management and a messaging center 302. As illustrated in FIG. 14, the cellular messaging system includes a Home Location Register 304 (HLR), Visitors Location Register 306 (VLR), a Mobile Switching Center 308 (MSC), and a Base Station 310 (BS), as is common to most conventional cellular networks. In accordance with current systems, a messaging agent 312, also referred to as Short Messaging Agent or entity (SME), generates a message to the Messaging Center 302 (MC). That message is forwarded to a Mobile Switching Center 308 for further delivery after receiving a message routing address corresponding to a desired destination. The desired destination typically is a Mobile Messaging Entity 314, which could be a two-way pager or similar device, shown by the acronym MS-SME in the drawings.

IS-136 supports approximately 420 channels, subsets of which are re-used in each cell of a cellular system. Each channel is capable of supporting 48.6 Kbps of traffic. The majority of channels in the system are used to support voice conversations. The remaining channels are used to support Digital Control Channels (DCCH). Each mobile station acquires a DCCH over which it exchanges control information and short messages with the cellular base stations.

The DCCH is divided into three forward channels (downlink) and one reverse channel (up-link). The forward channels are the Broadcast Control Channel (BCCH), Shared Control Feedback Channel (SCF), and the Short Messaging/Paging/Access Response Channel (SPACH). The BCCH is further divided into three control subchannels, two of which are used to broadcast system information, and one, called the Short Messaging Service Broadcast Control Channel (S-BCCH), which is reserved for delivering broadcast messages as part of a messaging service. The SCF is used to provide link layer status information to support mobile station media access procedures. The SPACH, as indicated by its name, is used to deliver messages as part of a short messaging service, pages as part of call delivery in telecommunications service, and resource assignments.

The reverse channel is called the Random Access Control Channel (RACH). This channel is used by the mobile station to send control messages or messages that are part of a short messaging service, to the cellular base station. Link layer feedback for this channel is provided over the SCF.

The architecture of a messaging system based on IS-136/IS41C is shown in FIG. 14. The Base Station 310 and Mobile Switching Center 308 (MSC) operate in similar capacities as in most standard cellular telephone networks. The Base Station 310 terminates the IS-136 protocol. The Home Location Register 304 HLR stores a permanent profile for each mobile messaging entity or other mobile station and a pointer to the current Visitors Location Register 306 (VLR) serving the entity. The Visitors Location Register 306 stores a temporary copy of the profile of any mobile station or mobile messaging entity, and a pointer to the Mobile Switching Center 308 with which a mobile station is currently registered. The Messaging Center is the heart of the messaging system, coordinating the activities of the other entities.

FIGS. 15a and b show graphically the flow for message delivery to an IS-136-based mobile station. Invocations are shown in capital letters and responses are shown in lower case letters. The messages shown in bold type are IS-136 messages. Those shown in italics are IS-41C messages. Those in regular print are representative messages defined in vendor-specific interfaces called the A-interface. In FIG. 15a, a mobile messaging entity 314 registers, perhaps by powering on. The Visitors Location Register 306 stores a pointer to the serving Mobile Switching Center 308 upon receiving the REGNOT message. It forwards this message to the Home Location Register 304 which stores a pointer to the Visitor Location 306.

At some later time, a fixed endpoint sends messages to the Messaging Agent 312 (SMDPP), as shown in FIG. 15b. The message is received by the Messaging Center 302 which queries the Home Location Register 304 to determine the location of the mobile station (SMSREQ or Mobile Messaging Entity 314). This messages contains the Mobile Identification Number (MIN) of the destination messaging entity. The request is propagated to the serving Mobile Switching Center 308 which assigns a routing address to the messaging entity (SMSADDR parameter). The routing address is returned to the Messaging Center 302 which then forwards the message to the serving Mobile Switching Center 308. The Mobile Switching Center 308 delivers the message via the Base Station 301 (SMS DELIVERY) over the messaging channel of IS-136.

Mobile messaging entities 314 may also initiate message exchanges. In this case, a mobile messaging entity 314 sends a message to an Messaging Center 302 via its IS-136 RACH.

Various classes of the system operation can be anticipation. The privacy and urgency classes are interpreted by a messaging entity; the network does not distinguish between these classes. The deferred message delivery may be explicitly requested, or activated by the network in cases when a mobile messaging entity 314 cannot be located (powered off, out of range, etc.) for message delivery. In these cases, the message is delivered when the mobile messaging entity 314 becomes active. Message updating allows a sender to overwrite a previously sent message.

This system has several other benefits. It can operate using the cellular network infrastructure for location management. By requiring messaging entities to register as they move, and updating Visitor Location Registers and Home Locations Registers, the network can direct messages accurately to its subscribers.

Several entities from the system may be added to the IS-16/IS-41C cellular system to provide advance messaging capabilities in accordance with the present invention, as shown in FIG. 16. The Messaging Server functions are performed by the IS-136/IS-41C Messaging Center 302. Both entities receive messages, coordinate the invocation of any other servers, and then forward the messages to another entity that can deliver them.

The Distribution Server 320 functions may also be subsumed in the Messaging Center, although in FIG. 16 it is shown as a separate entity. In the IS-136/IS41C system, the Messaging Center 302 determines the location of the destination messaging device through interactions with the Home Location Register 304, and then forwards the message. Alternatively, this function could be performed in a similar manner by an external Distribution Server 320, as shown in FIG. 16. In this case, the Messaging Center 302 would invoke any services triggered by the receipt of the message, (e.g., deferred delivery), and send the message to the Distribution Server 320 which would be responsible for delivering it. The Distribution Server 320 would interact with the Home Location Register 304 to determine the location of the destination Mobile Messaging Entity 314.

The user agent function is not included in the IS-136/IS-41C system. By adding a user agent 322 to the system, message expansion may be performed inside the network. This allows shorter, coded messages into the network, which saves resources on the air interface. Messages may also contain variables and selections. The user agent may also be used to provide value-added services, such as message screening. Because the IS-136/IS-41C system uses Home location Registers 304 and Visitor Location Registers 306 to track location information, the location functions of the user agent are not required in this system.

The transaction server functions are not included in IS-136/IS-41C. By adding a transaction server 324 to the system, value-added transaction services may be supported in the cellular messaging system. These include all of the transaction services supported in the system.

If user agents and transaction servers are added to the system, the procedures in the Messaging Center 302 must be modified. The Messaging Center 302 must forward incoming message request to the user agents, and must recognize when transaction services are being requested. These additions do not violate the cellular standards. The value-added servers may be implemented as adjunct processors to the Messenger Center 302 or they may be implemented as remote processors. In the former case, only the procedures of the Messaging Center 302 must be modified; no external messages are generated. In the latter case, operations must be defined between the Messaging Center and remote processors, as is the case with many telecommunications services today. These operations may be invoked using standard Signaling System No. 7 protocols, such as the Transaction Capability Application Part (TCAP).

FIGS. 17a and 17b illustrate the message distribution flow when messaging system of the present invention is used.

New block reference numeral designations are used for purposes of clarity. Two mobile messaging entities (MS-SME) are used. Moving from left to right, the blocks designate a first Mobile Messaging Entity (MS-SME) 400; a Base Station (BS) 402; Mobile Switching Center (MSC) 404; Visitors Location Register (VLR) 406; the sender's Home Location Register/User Agent (HLR-S/UA-S) 408; the recipient's Home Location Register/User Agent (HLR-R/UA-R) 410; Transaction Server (TX) 412; Messaging Center (MC) 414; Distribution Server (DS) 416; and Second Mobile Messaging Entity (MS-SME) 418. Major differences between the flow presented in FIGS. 17a and 17b and the flow presented in FIGS. 15a and 15b are described in detail. Other parts of the message flow, such as registration process are similar.

FIG. 17a illustrates a registration process and shows that the registration flow of the Mobile Messaging Entity 400 is similar to the registration described in FIG. 15a. Registration occurs in the respective user agents defined as Home Location Register/User Agents 408, 410.

Referring now to FIG. 17b, the messaging flow after registration is illustrated. A first coded message SMDPP is sent from a Mobile Messaging Entity 418 to a Messaging Center 414. The message is coded so that later message expansion occurs in the network. An acknowledgement is then sent back. Instead of going to a home location register of the recipient as in the previous example of FIG. 15b, the message is forwarded to the HLR-S/UA-S 408 of the sender. In the HLR-S/UA-S 408, message expansion occurs and the message is forwarded back to the Messaging Center 414 and then to the HLR-R/UA-R 410 of the recipient. The user agent of the recipient can do filtering, request a new format or provide location information. The user information could poll the Visitor Location Register 406 as in the current system or could bypass as shown in this example. A Home Location Register could provide location information. The message is forwarded to the Messaging Center 414.

The message then is forwarded to a Transaction Server 412 to open up a transaction. The transaction is then returned to the Messaging Center 414, and then sent to the Distribution Server 416, which performs a directed paging algorithm. The message flow then is very similar to the previous example with the SMDPP and the acknowledgments that revert back to the Distribution Server.

The messaging system of the present invention has many benefits. Messaging expansion is possible within of the user agent. Additionally, the user agent can filter messages and perform other functions. Transaction support also can be current within the cellular network. The system allows directed paging and can change areas using the directed paging function, which reduces the number of needed registrations. It is not necessary to register every time a switching area is changed and there is no need for a Visitors Location Register. The Distribution Server also can perform directed paging.

Each server also can be deployed as desired. If directed paging algorithm is not running, then no Distribution Server is necessary. If message expansion is not needed, a user agent is not necessary. This gives added flexibility to the system. All servers are flexible.

While the best mode for carrying out the invention has been described in detail, those familiar with the art which the invention relates will recognize various alternative designs and embodiments practicing the invention as defined by the following claims.

That which is claimed is:

1. A two-way messaging system, comprising:

a messaging network over which messages are sent;

a pager coupled to the messaging network via a downlink and an uplink;

said pager including a plurality of messages and corresponding message codes;

the pager sending an originating message code to the messaging network via the uplink;

said originating message code including a multiple message destination address that includes a plurality of destination addresses;

the messaging network including a plurality of messages and corresponding message codes that are identical to said messages and codes in said pager;

the messaging network expanding the originating message code into a message, and forwarding the message to each of the plurality of destination addresses;

a transaction server coupled to the messaging network, the transaction server opening a transaction for tracking each message sent over the messaging network corresponding to the message code from the pager to a message recipient, and closing the transaction for preventing further delivery of the message and a reply to the message after a service associated with the transaction is complete;

a conversation manager within the transaction server maintaining the transaction server in open and closed states;

a transaction manager within the transaction server communicating with the conversation manager and tracking a state of a message recipient involved with the transaction, the transaction manager communicating with the conversation manager to close a transaction after the transaction manager determines that the transaction should be closed, thereby limiting replies from one or more of the plurality of destination addresses of the multiple message destination address.

2. The two-way messaging system according to claim 1, wherein the service associated with the transaction is receipt of a reply by the pager from each message recipient.

3. The two-way messaging system according to claim 1, wherein the service associated with the transaction is receipt of a reply by the pager from a predetermined number of message recipients.

4. The two-way messaging system according to claim 1, wherein the service associated with the transaction is complete when a predetermined amount of time expires after the message is sent to each message recipient.

5. The two-way messaging system according to claim 1, wherein the service associated with the transaction is complete based on a number of replies that are accepted for the transaction and a number of message recipients that have the closed state.

6. The two-way messaging system according to claim 1, wherein the messaging network is a wireless messaging network.

7. A two-way messaging system, comprising:

a messaging network over which messages are sent;

a pager coupled to the messaging network via a downlink and an uplink;

said pager including a plurality of messages and corresponding message codes;

the pager sending an originating message code to said messaging network via the uplink;

the originating message code including a multiple message destination address that includes a plurality of destination addresses;

the messaging network including a plurality of messages and corresponding message codes that are identical to said messages and codes in said pager;

the messaging network expanding the originating message code into a message, and forwarding the message to each of the plurality of destination addresses;

a transaction server coupled to the messaging network, the transaction server initializing at least one record for monitoring a service associated with each message sent over the messaging network corresponding to the message code from the pager to a message recipient, and deleting each record initialized for a message for preventing further delivery of the message and a reply to the message after the service associated with the message is complete;

a conversation manager within the transaction server maintaining the transaction server in open and closed states;

a transaction manager within the transaction server communicating with the conversation manager and tracking a state of a message recipient involved with the transaction, the transaction manager communicating with the conversation manager to close a transaction after the transaction manager determines that the transaction should be closed, thereby limiting replies from one or more of the plurality of destination addresses of the multiple message destination address.

8. The two-way messaging system according to claim 7, wherein the service associated with the message is complete when a predetermined amount of time expires after the message is sent to each message recipient.

9. The two-way messaging system according to claim 8, wherein the predetermined amount of time is specified by the pager.

10. The two-way messaging system according to claim 7, wherein the service associated with the message is receipt of a reply by the pager from each message recipient.

11. The two-way messaging system according to claim 7, wherein the service associated with the message is receipt of a reply by the pager from a predetermined number of message recipients.

12. The two-way messaging system according to claim 7, wherein the service associated with the message includes one of an all-reply, an N-reply and a timed-reply.

13. The two-way messaging system according to claim 7, wherein the service associated with the message is complete based on a number of replies that are accepted for the transaction and a number of message recipients that have the closed state.

14. The two-way messaging system according to claim 7, wherein the messaging network is a wireless messaging network.

15. A two-way messaging system, comprising:

a messaging network having a first communication channel over which a subscriber to the messaging network receives a message from the messaging network and a second communication channel over which the subscriber sends a message to the messaging network;

a pager of said subscriber coupled to said messaging network via said first communication channel and said second communication channel;

said pager storing a plurality of predetermined messages and corresponding message codes;

said pager sending a message code to said messaging network;

a user agent coupled to the messaging network, the user agent storing a plurality of predetermined messages and corresponding message codes that are identical to said messages and codes in said pager, each predetermined message corresponding to a message code, the user agent receiving a message code from a subscriber of the messaging network and forwarding the predetermined message corresponding to the received message code to a message recipient over the messaging network; and a transaction server coupled to the messaging network, the transaction server opening a transaction for tracking each message sent over the messaging network corresponding to the message code from the pager to a message recipient, and closing the transaction for preventing further delivery of the message and a reply to the message after a service associated with the transaction is complete;

a conversation manager within the transaction server maintaining the transaction server in open and closed states;

a transaction manager within the transaction server communicating with the conversation manager and tracking a state of a message recipient involved with the transaction, the transaction manager communicating with the conversation manager to close a transaction after the transaction manager determines that the transaction should be closed, thereby limiting replies from one or more of the plurality of destination addresses of the multiple message destination address.

16. The two-way messaging system according to claim 15, wherein the service associated with the transaction is receipt of a reply by the pager from each message recipient.

17. The two-way messaging system according to claim 15, wherein the service associated with the transaction is receipt of a reply by the pager from a predetermined number of message recipients.

18. The two-way messaging system according to claim 15, wherein the service associated with the transaction is complete when a predetermined amount of time expires after the message is sent to each message recipient.

19. The two-way messaging system according to claim 18, wherein the predetermined amount of time is specified by the pager.

20. The two-way messaging system according to claim 15, wherein the service associated with the transaction is complete based on a number of replies that are accepted for the transaction and a number of message recipients that have the closed state.

21. The two-way messaging system according to claim 15, wherein the service associated with the transaction includes one of an all-reply, an N-reply and a timed-reply.

22. The two-way messaging system according to claim 15, wherein the messaging network is a wireless messaging network.

23. A method for two-way messaging, the method comprising the steps of:

storing a plurality of predetermined messages and corresponding message codes in a pager;

storing a plurality of predetermined messages and corresponding message codes that are identical to said messages and codes in said pager within a two-way messaging network, each of the plurality of predetermined messages corresponding to a message code selected by a subscriber of a two-way messaging network;

receiving a message code from the pager via an uplink;

expanding the message code received from the pager within the two-way messaging network to form the predetermined message corresponding to the received message code and a multiple message destination address that includes a plurality of destination addresses;

forwarding the predetermined message corresponding to the message code from the pager to a recipient at each of the plurality of destination addresses based on a content of the message code received from the pager;

opening a transaction for tracking a service between the pager sending the message code and each recipient;

closing the transaction for preventing further delivery of the predetermined message and a reply to the predetermined message after the service is complete; and limiting replies from one or more of the plurality of destination addresses of the multiple message destination address.

24. The method according to claim 23, further comprising the step of maintaining the transaction open until a reply has been received by the pager from each message recipient.

25. The method according to claim 23, further comprising the step of maintaining the transaction open until a predetermined amount of time expires after the message is sent to each message recipient.

26. The method according to claim 23, further comprising the step of maintaining the transaction open until a predetermined number of message recipients receive the predetermined message.

27. The method according to claim 23, wherein the messaging network is a wireless messaging network.

28. The method according to claim 23, wherein the service is complete when a predetermined amount of time expires after the message is sent to each message recipient.

29. The method according to claim 28, wherein the predetermined amount of time is specified by the pager.

* * * * *